United States Patent
Chidambaran et al.

(10) Patent No.: US 7,338,600 B2
(45) Date of Patent: Mar. 4, 2008

(54) FRACTIONAL DEIONIZATION PROCESS

(75) Inventors: Ravi Chidambaran, Canonsburg, PA (US); Pavan Raina, Pune (IN); Devesh Sharma, Washington, PA (US)

(73) Assignee: Aquatech International Corporation, Canonsburg, PA (US)

(*) Notice: Subject to any disclaimer, the term of this patent is extended or adjusted under 35 U.S.C. 154(b) by 334 days.

(21) Appl. No.: 11/030,926

(22) Filed: Jan. 7, 2005

(65) Prior Publication Data

US 2005/0121397 A1 Jun. 9, 2005

(51) Int. Cl.
*B01D 61/48* (2006.01)
*C02F 1/469* (2006.01)

(52) U.S. Cl. ............... 210/243; 210/748; 204/524; 204/533; 204/536; 204/632; 204/633

(58) Field of Classification Search ........... 210/660, 210/663, 672, 687, 748, 243; 204/520, 522–524, 204/533, 536, 630, 632, 633
See application file for complete search history.

(56) References Cited

U.S. PATENT DOCUMENTS

| | | | |
|---|---|---|---|
| 2,854,394 A | 9/1958 | Kollsman | |
| 2,923,674 A | 2/1960 | Kressman | |
| 3,149,061 A | 9/1964 | Parsi | |
| 3,291,713 A | 12/1966 | Parsi | |
| 3,330,750 A | 7/1967 | McRae et al. | |
| 4,172,779 A * | 10/1979 | Yamaguchi et al. | 204/529 |
| 4,298,442 A | 11/1981 | Giuffrida | |
| 4,381,232 A * | 4/1983 | Brown | 204/519 |
| 4,956,071 A | 9/1990 | Giuffrida et al. | |
| 4,969,983 A | 11/1990 | Parsi | |
| 5,026,465 A * | 6/1991 | Katz et al. | 204/524 |
| 5,925,255 A | 7/1999 | Mukhopadhyay | |
| 6,156,180 A | 12/2000 | Tessier et al. | |
| 6,187,162 B1 | 2/2001 | Mir | |
| 6,254,753 B1 | 7/2001 | Mir | |
| 6,296,751 B1 | 10/2001 | Mir | |
| 6,344,122 B1 * | 2/2002 | Deguchi et al. | 204/632 |
| 6,365,023 B1 | 4/2002 | De Los Reyes et al. | |
| 6,379,518 B1 | 4/2002 | Osawa et al. | |
| 6,391,178 B1 | 5/2002 | Garcia et al. | |
| 6,398,965 B1 | 6/2002 | Arba et al. | |
| 6,402,917 B1 | 6/2002 | Emery et al. | |
| 6,436,261 B1 | 8/2002 | Sato et al. | |
| 6,444,107 B2 * | 9/2002 | Hartel et al. | 204/531 |
| 6,471,867 B2 | 10/2002 | Sugaya et al. | |
| 2002/0020626 A1 | 2/2002 | Sato | |
| 2002/0092769 A1 | 7/2002 | Garcia et al. | |
| 2002/0125137 A1 | 9/2002 | Sato et al. | |

* cited by examiner

*Primary Examiner*—Frank M. Lawrence
(74) *Attorney, Agent, or Firm*—Buchanan Ingersoll & Rooney PC

(57) ABSTRACT

A liquid treatment process is described for sequential removal of ionic species of progressively decreasing ionic strength without precipitation or "scaling." An aspect of the invention includes two or more electrodeionization operations within one or more electrodeionization stacks. The first electrodeionization operation is performed at a voltage calculated to remove strongly ionized species such as calcium and magnesium from the feed water without scaling. The product of the first electrodeionization operation is then subjected to a second electrodeionization operation. The second electrodeionization operation is performed at a voltage the same as the first electrodeionization operation, and is designed to remove more weakly ionized species such as silica and carbon dioxide, preventing scaling. More than two successive electrodeionization operations may be performed if desired. Multiple electrodeionization operations may occur in a single electrodeionization stack or in multiple electrodeionization stacks.

3 Claims, 8 Drawing Sheets

FDI PROCESS

WATER SPLITTING AT RESIN MEMBRANE INTERFACE

WATER SPLITTING AT RESIN-RESIN INTERFACE

FDI PROCESS

FRACTIONAL DEIONIZATION PROCESS

CROSS-REFERENCE TO RELATED APPLICATIONS

This application claims the benefit of U.S. Utility patent application Ser. No. 10/325,372, filed Dec. 19, 2002, now U.S. Pat. No. 6,896,814 which in turn claims the benefit of U.S. Provisional Application No. 60/343,323, entitled "Fractional Deionization Process," filed Dec. 20, 2001, now abandoned, the entire disclosures of which are incorporated by reference herein.

FIELD OF THE INVENTION

The present invention relates to a novel technique for removal of ionic species from a feed stream without creating any scaling, even at higher levels of inlet water hardness. The invention deionizes water using a controlled process system that allows the removal of some ionic components separately from other ionic components without causing any scaling problem in the dilute or concentrate compartment of the cell. Such scaling has been the limiting operating condition of preexisting electrodeionization ("EDI") systems and explains the lack of commercial success for such systems. Generation of $H^+$ and $OH^-$ ions at controlled conditions with proper pH controls in the fractional deionization process ("FDI") is responsible for removing ionic components in an energy efficient manner from feed water to a much greater extent than conventional EDI, without any scale formation, and is also responsible for allowing the removal of any weakly ionized components to give pure water. The environmentally friendly technique, which does not generate any pollution and avoids using any chemicals, can be easily used for separation of fluids other than water.

BACKGROUND OF THE INVENTION

Among the major environmental challenges facing society is the purification of water. Water is essential not only for the living body but also for industrial purposes. For these reasons there is a greater need to upgrade water purification technology.

Typical prior art systems to purify water fall into one of three categories. These are (1) ion exchange resin based systems, (2) ion exchange membrane based systems, and (3) EDI systems. These systems are discussed briefly below.

Ion Exchange Resin Based Systems:

The ion exchange resin adsorbs ionic species at their respective active sites. Once the active sites have been exhausted, the resin can be regenerated by washing the resin with acid or alkali to replace either $H^+$ or $OH^-$ ions, respectively. This process is called regeneration of resin, and it is the main source for removal of cations and anions from various types of fluids. Demineralizing water is one of the most significant uses of this technology.

Ion Exchange Membrane Based System:

The ion exchange membranes are made of the same material as resin but work on a different principle. In the membrane based system, an electrical driving force is used to activate the movement of ions present in the water within a chamber of the anion and cation membrane. The ions are attracted towards the opposite electrical pole, then they meet the ion selective membrane, which allows selective movement of the ions. The cation membrane allows cations to move across the membrane and stops any anion from passing through. Similarly, an anion is allowed to pass through the anion membranes, but cations are prevented from further movement.

An electrodialysis process uses a voltage that is much below the point at which water splitting occurs in water. Electro dialysis has a limitation when it comes to treating water for high purity requirements because of high system resistance and its inability to remove ions like silica.

EDI System:

EDI is a technology that uses resin for its inherent ion adsorbing property along with the ion exchange membrane system of electrodialysis. EDI utilizes electrodialysis process along with resin as a conducting media introduced between the membranes. Normal EDI works on a very narrow band of feed water quality. The feed water quality required has to be equivalent to the product of reverse osmosis ("RO"), with hardness less than 1000 ppb. Some prior art teaches use of the RO prior to treatment (U.S. Pat. No. 6,379,518). Because of the inability of RO to provide this quality of feed water, softener also becomes a prerequisite.

In EDI, the resin has to adsorb the ions present in the water. The resin then releases these ions, giving them a definite mobility and direction towards the membrane. $H^+$ and $OH^-$ ions have to be generated in the system. The regeneration of the resin caused by the $H^+$ and $OH^-$ ions supplements the natural regeneration of resin due to the electrical driving force. Ions have to be transported across the membrane into the reject chamber. In water containing highly ionized species as hardness, along with weakly ionized species such as silica and carbonic acid, normal EDI is limited in its ability to remove all ionic species without a high probability of scaling in the system. The feed to EDI is generally limited, therefore, to feed water with hardness less than 1 ppm. Prior art EDI systems include those that make use of resin ion exchangers of various pore sizes (U.S. Pat. No. 6,471,867) or multiple types of resin in multiple deionization stacks.

In most feed water systems the impurities to be removed include strongly ionized cations, such as sodium and calcium, and strongly ionized anions, such as chloride and sulfate. Sodium and chloride ions have a cleaner removal compared to calcium, because the former ionized species are not chemically inclined to precipitate in EDI. Calcium and magnesium, on the other hand, are vulnerable to precipitation. Depending on the alkalinity of the system, calcium and magnesium convert to the hydroxide or carbonate form; the hydroxide and carbonate products then tend to precipitate.

Present EDI technology does not allow effective separation of mixed strongly and weakly ionic samples, because all ions are subjected to a uniform electrical driving force (U.S. Pat. No. 4,298,442, U.S. Pat. No. 6,391,178). For this reason the limiting condition for the presence of calcium or hardness in such systems is kept at the low limit of 1000 ppb.

Prior art EDI systems are unable to achieve the necessary hardness tolerance required to prevent scaling. Although such systems claim a maximum hardness tolerance of 1 ppm, the systems have been found vulnerable to scaling even at 1 ppm, limiting the usage of the process. Furthermore, some prior art systems designed to prevent scaling and reduce silica require the use of multiple deionizing apparatus and the addition of harsh chemicals (U.S. Pat. No. 6,398, 965), the use of a nonstandard resin (U.S. Pat. No. 6,187, 162), or the use of different types of resin in different stacks (U.S. Pat. No. 3,330,750; U.S. Pat. No. 3,149,061, U.S. Pat. No. 6,402,917). The present invention is directed toward overcoming one or more of the above-mentioned problems by offering a purification process that may be operated in one or more stacks, does not require the addition of harsh chemicals, and may utilize a uniform resin composition.

SUMMARY OF THE INVENTION

A fractional deionization process for the purification of water using multiple stages of electro-deionization is provided in the current invention. This process may be used to purify water that contains contaminants such as magnesium, calcium, carbon dioxide, and silica; of course, the inventive process is not limited to such uses. The fractional deionization process includes treatment of a contaminated feed stream in a first deionization module through which a first voltage is applied. Other variables in the deionization process having been accounted for, this first voltage is calculated to remove strongly ionized species from the feed stream while the system is maintained in a state that is not conducive to "scaling" or precipitation of some ions that might otherwise leave the feed stream at inopportune points in the deionization system.

After the feed stream has passed through the first deionization module it becomes the first product stream. Although strongly ionized contaminant species have been substantially eliminated from the first product stream through operation of the first deionization module, a number of more weakly ionized species may remain. The first product stream is therefore introduced into a second deionization module. A second voltage is applied to the second deionization module. Greater than the first voltage, the second voltage is calculated to facilitate removal of more weakly ionized species than were removed in the first module. In conventional electro-deionization, application of a voltage of sufficient strength to remove more weakly ionized species tends to cause scaling of the more strongly ionized species due to creation of an unfavorable pH. In the instant invention such strongly ionized species are no longer present after having been removed in the first deionization module. Weakly ionized species may therefore be efficiently removed without fear of scaling. The process therefore becomes more energy efficient.

The process described is best practiced when the feed stream is introduced with around neutral pH and is maintained at a flow velocity of 100 to 200 cm/minute. Of course, other conditions may be contemplated. Although one embodiment of the invention would have the entire process take place within a single deionization stack modified to allow application of more than one voltage at varying points of the stack, another embodiment would have each step of the process occur in a separate, single-voltage stack.

The process is not limited to the use of only two discrete deionization modules with two discrete voltages. Rather, any number of deionization modules and voltages may be used, to allow increased differentiation of the ionic species removed at each deionization module. If multiple modules were used, the process could occur in one or more stacks.

Unlike prior art systems that require different types of resin in separate stacks, the present invention may use the same type of resin in each stack.

Other aspects and advantages of the present invention can be obtained from a study of the specification, the drawings, and the appended claims.

DETAILED DESCRIPTION OF THE PREFERRED EMBODIMENT

Figure 1:
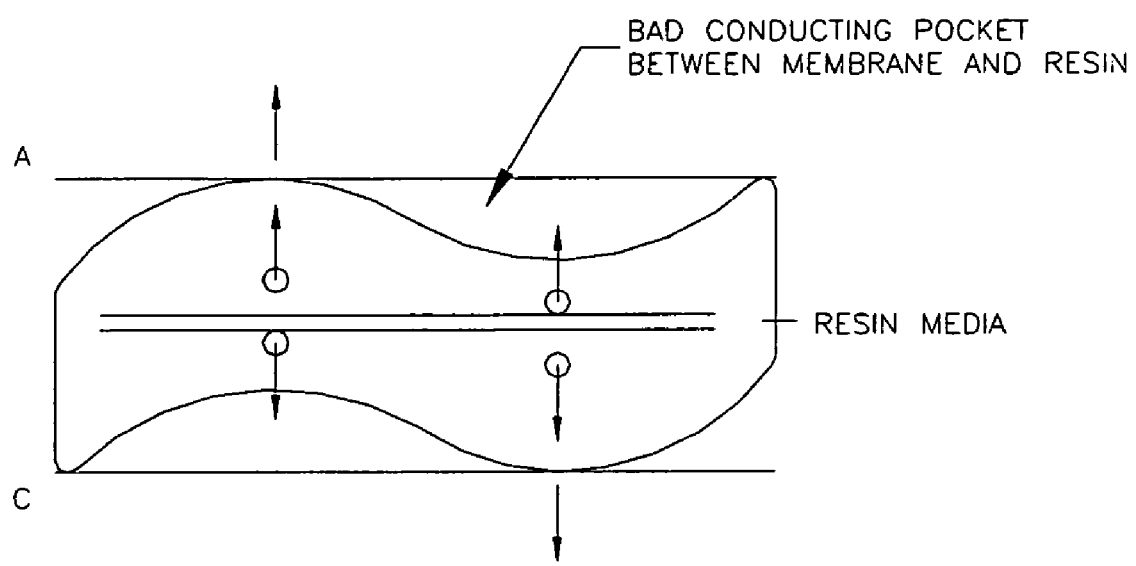
FIG. 1 Flow pattern in a dilute compartment not packed resulting in the by-passing of the flow and maintaining a continuity of the media for ionic movement FIGS. 2a and 2b Represents the two possible scenarios of accelerated water splitting at resin-resin and resin-membrane interfaces FIG. 3 Diagram illustrating a possible scenario for ionic movement in the first stage resulting in a lower pH in the first stage reject

The FDI process of the present invention utilizes salt/ion separation of the ion exchange resin and the ion exchange membrane together with the additional function of water splitting in a controlled, sequential manner. This allows a higher level of hardness to be introduced to the system for purification without danger of scaling. The FDI process has been used to remove calcium and silica under successive conditions conducive to each of them. In prior forms of EDI, conditions that are favorable for silica removal also result in hardness removal; however, at higher hardness concentration precipitation occurs at conditions suitable for the removal of silica. Such precipitation is eliminated in this invention.

The FDI process relates to the selective removal of ionic species under different electrochemical process conditions which creates pH conditions by design favorable to non scaling and keeping the ions in solution within the electrodeionization stack. In a conventional electrodeionization stack a voltage is applied across the stack, which contains charged media positioned between the membranes. While a lower voltage and the consequent current can remove divalent ions such as $Ca^{2+}$ and $Mg^{2+}$, much higher voltages are required to remove difficult ions such as silica. When a conventional EDI stack is operated at higher voltage to remove silica, divalent ions such as $Ca^{2+}$ and $Mg^{2+}$ precipitate from the feed stream due to resultant pH. This causes scaling in the stack.

FDI overcomes this deficiency of the conventional EDI system that has low hardness tolerance. FDI allows generation of resin-regenerating ions and imparts mobility to target the ionic species slated for removal. This permits separation without scaling in the system, even for feed water with a hardness of 5 ppm. In FDI, different voltages are applied across adjacent electrodeionization stacks or in adjacent regions within a single electrodeionization unit. A low voltage is applied across the first stack or part of a stack to remove the hardness. A higher voltage is then applied in the second stack or part of a stack to remove the silica and other difficult ions. FDI is, therefore, not susceptible to scale formation due to initial high hardness in the feed water stream, because at the silica removal stage, where pH is alkaline, the feed does not have hardness left to be removed.

Details of the FDI Process:

Fractional deionization process has been devised with a concept of improving the hardness tolerance of the system without resulting in any precipitation. This has also been designed with a requirement that there should not be any external chemical dosing to prevent scaling, for example acid need not be added. At the same time the system should be able to deliver the target product quality and silica reduction in an energy efficient manner.

Fractional deionization process has also been designed keeping the following issues in mind:

1. Certain ionic species, e.g. $Ca^{2+}$, $Mg^{2+}$, $Na^+$, $Cl^-$, and sulphates are easier to remove because of their natural affinity to respond to deionization adsorbtion process and their ability to transport themselves within the resin media in the direction of driving force.
2. Such ionic species do not need high driving force and can be deionized under milder conditions of DC voltage because of their high mobility within the resin media.
3. Certain other species do not exist in readily adsorbable or transportable form and do need modification in their structure to respond to the deionization process.
4. Ionic species defined in 3 above need higher driving force.
5. Water is known to split above a specific voltage, and extent of splitting can be controlled by controlling the applied voltage and the consequent current.
6. The pH of the reject stream can be controlled by extent of application of water splitting and behavior of hydrogen and hydroxyl ions and be made conducive to keeping scaling products in solution.

Fractional deionization uses the above mentioned concepts to arrive at the objectives of the design. In a sequential manner, or within the same stack, the focus remains on removing ionic species resulting in scale formation and other monovalent ions by applying minimum possible voltage of 3-5 volts per cell pair, which is just above the water splitting voltage. The removal of divalent ions and to some extent monovalet ions like $Na^+$, $K^+$, $Cl^-$ and $HCO_3^-$ can be achieved in a electrodeionization stack just by facilitating transportation and providing direction of transportation and does not need a highly regenerated environment. Water splitting happens but is controlled to an extent where the pH in the reject is less than neutral or acidic, which helps in controlling the saturation index to keep the potential scaling products in solution. This is possible due to transfer of some hydrogen ions to the reject stream and reduction of the resultant alkalinity, whereas hydroxyl ions are still not able to influence the process due to their slower diffusion. The $OH^-$ ions remain within the dilute compartment or get consumed by the anion consumers and become a part of first stage product. This applied voltage is sufficient to significantly reduce the hardness to less than 0.5 ppm as $CaCO_3$. However at this time there is no reduction in silica and there is partial reduction in other ionic species which are detailed later in the examples. Here all the ions responsible for scaling have been fractionally removed without applying high voltage, which is not required for their removal and can cause scaling if it is applied. In a same stack this is achieved by passing feed water through the lower portion of the stack first, which is under the influence of a lower voltage. This part of the stack is called the hardness removal zone. If it is done in a single stack a sample can be drawn from this part of the stack through a sampling point to measure reduction in hardness and test of other parameters. If it is done in a separate stack, a sample can be drawn from the product outlet of the first stack to ascertain the performance.

This approach enables water to now pass through the next stage (within the same stack or in a different stack), where high driving force in terms of applied voltage, is required to modify and transport the more difficult ions, which need higher degree of water splitting. If a higher voltage of 10-15 volts per cell pair is applied, there is sufficient water splitting to regenerate anion sites to adsorb silica after the preferential removal of other anions and to regenerate the anions of silica in its different anionic forms, which are now transportable to the reject stream through the membrane media and membranes. Similarly carbon dioxide also gets combined with available hydroxyl ions and get transported to reject stream as $HCO^-_3$ ions. The PH in the reject stream here is above 9 and mostly 9 to 10.5. This is because the hydroxyl ions act as carriers for silica and carbon dioxide to the reject stream which is probably due to their easier diffusion through the anion resin media. This results in alkaline pH in the reject stream and keeps silica completely in solution. In this process other monovalent anionic and cationic ions are also removed to the expected levels. Silica reduction to an extent of less than 5 and up to 2 ppb is possible in this process without any precipitation. When removal of silica in a same stack is achieved, it happens in top section of the stack that is under the influence of higher voltage. This part is called a silica removal zone. A sample can be separately drawn to analyze conductivity and silica to assess the performance of this part of the stack.

The reject streams of these two stages are handled separately and kept in a recirculation mode.

The following issues are also important to understand and differentiate the working of FDI:

1. Resin Characteristics in the Different Stages of Fractional Deionization Process It was found that the characteristics of resin are somewhat different in different stages of FDI because each is under the influence of different type of ionic load. It is important that in both stages the resin between the membranes is totally packed and totally in contact with the membrane surface. This is required to ensure that there is no bypassing of the flow, as shown in FIG. 1, and also to ensure that the media remains continuous for easy transfer of ions through media to membrane and then to reject stream.

It was found that if the first stage media is prepared with regenerated resin, the performance of the first stage was not consistent. The hardness results would not be consistent and the material balance results of hardness removed from feed versus what was collected in reject would not tally. This would be the result of shrinkage of resin once it comes in operation, causing lack of contact and deterioration of performance. This was also evident when dilute spacers were examined after opening the stack under these conditions. If the media is made with fully packed exhausted resin, however, the performance in terms of hardness reduction would start from the beginning and stay consistent with operation because resin would be partially regenerated once the operation starts, this would further improve the contact because of swelling characteristics of resin. With this there was no difficulty in establishing material balance of ions. This further corroborates that the first stage deionization is more a result of transportation of ions, which is facilitated by the media under the influence of mild driving force of low voltage. There is no significant regeneration, which is clear from the fact that even with exhausted resin the performance in terms of target hardness reduction is achieved. The effect of water splitting is minimal and only helps to maintain a favorable pH in the reject stream. Therefore the resin in the first stage stays very close to an exhausted state and only 5% scope for expansion is provided while filling the dilute chamber.

In the second stage resin should be regenerated completely, and that is dependent on water splitting at elevated voltages. This needs several hours of regeneration before the performance can be established and before the resin can be brought to a highly regenerated state, even when the media is made with externally regenerated resin. But in this case performance improves with time. It is also required that resin remains totally packed. However the resin volumes are less than what is required in previous stages for the same dilute spacer volume because of higher levels of regeneration and consequent filling in a swollen state. Net volumes of resin required in the second stage is 10-12% less than what is required in the first stage and 15-20% provision of volume is provided for expansion.

It is clear from this that in FDI resin characteristics and mechanism of de-ionization are quite different in two stages.

Control of Water Splitting and their Sites

Figure 2A:
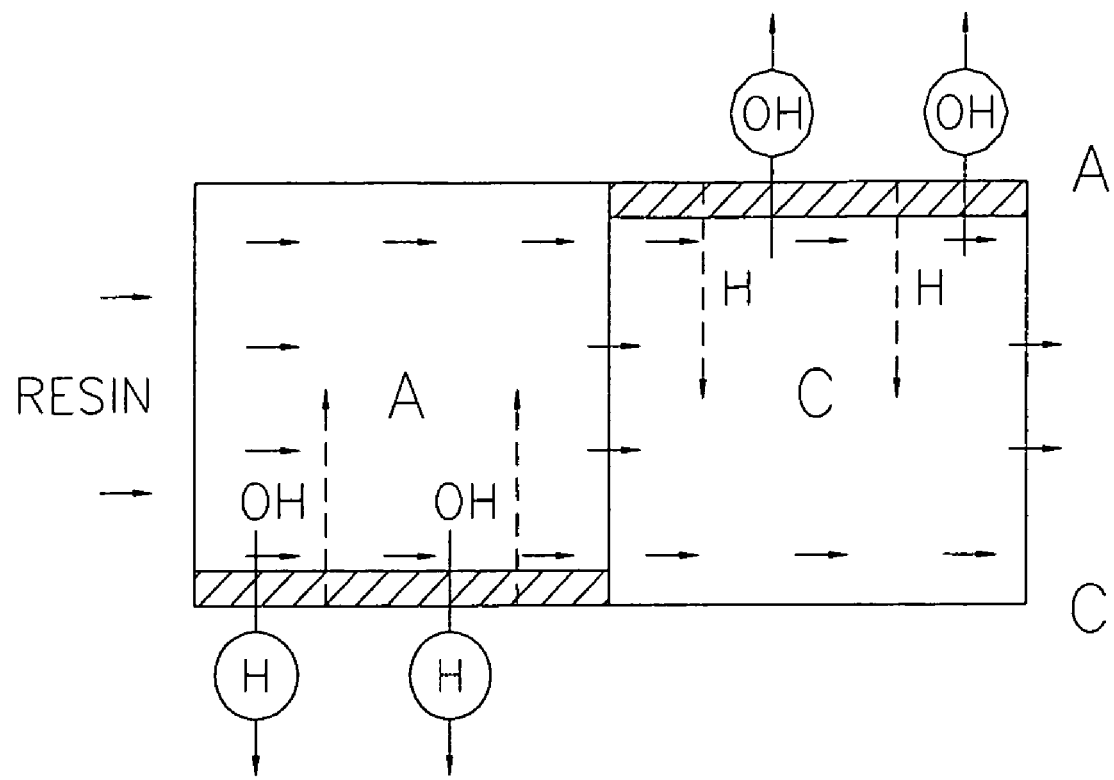
Figure 2B:
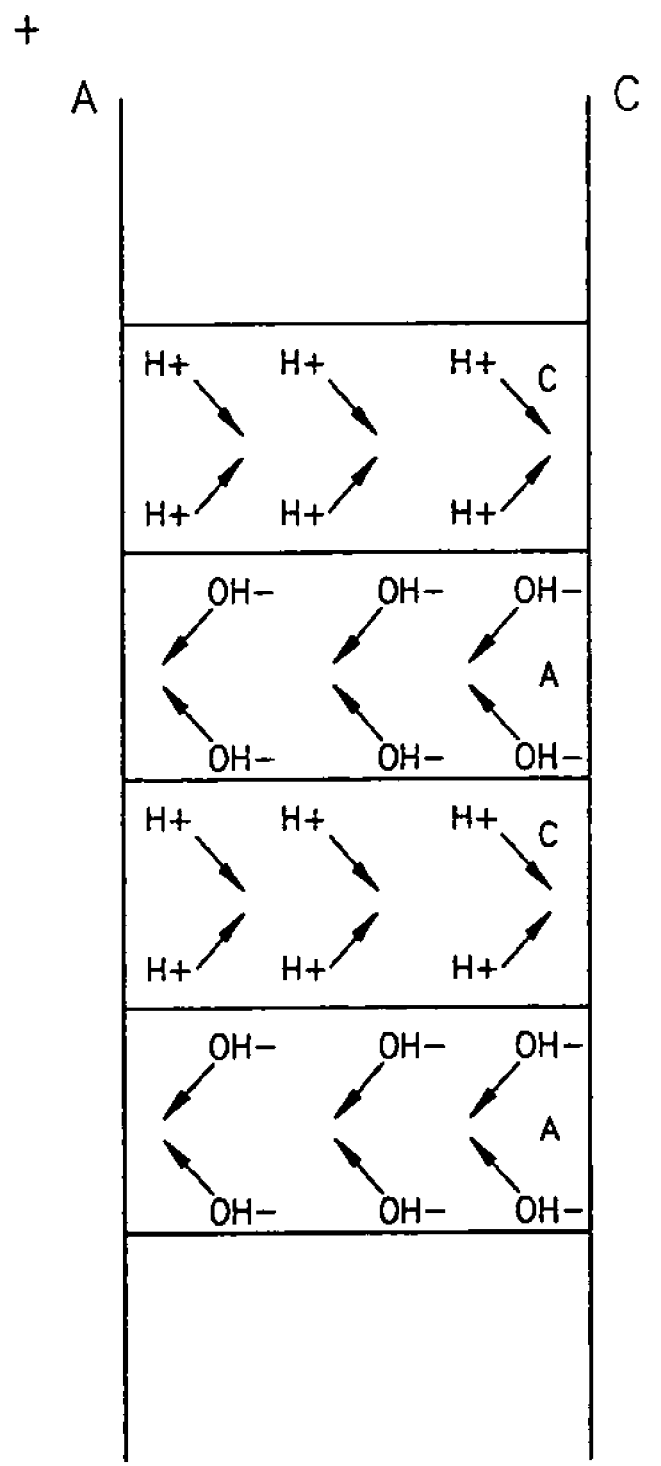
Figure 3:
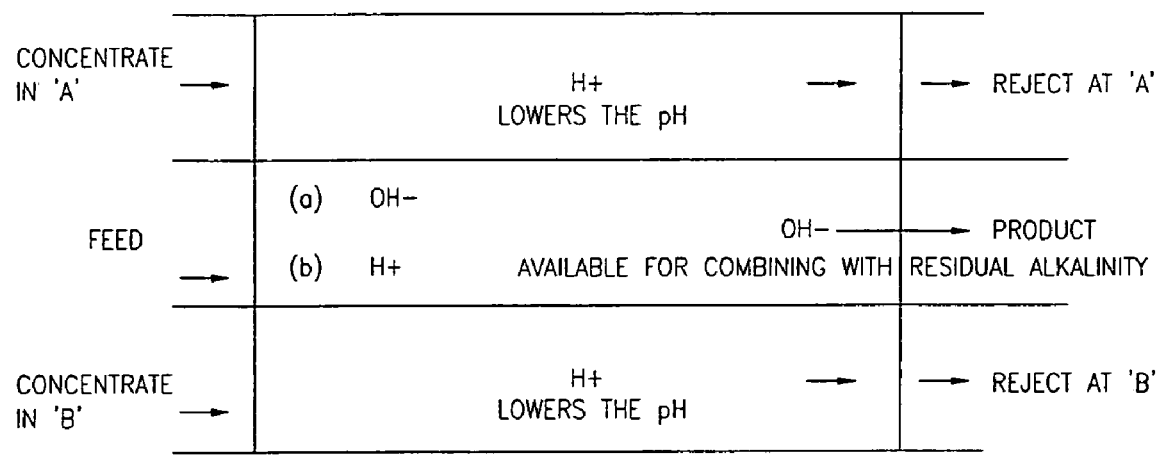

Water splitting is known to happen above a minimum voltage for the system, however, it is accelerated at dissimilar resin-resin and resin membrane interfaces shown in FIGS. 2a and 2b. the following criteria are important in FDI process to control and utilize the water splitting:

1. Water splitting happens in a controlled manner so that it can be avoided if it is not required to save energy. This is relevant for first stage of FDI, where the bulk of the reduction can be achieved without any significant water splitting.
2. Water splitting happens at specified sites where, in the design, there are higher probabilities of using the $H^+$ and $OH^-$ ions in regeneration of the relevant sites rather than their recombining or going to a reject stream without any participation or beginning to affect the product pH unfavorably.
3. Water splitting happens at sites that are under the influence of heavy mixing and not stagnant to avoid chances of any local precipitation.

After working with several combinations of distribution of bipolar surface area in between resin-resin and resin-membrane interfaces, it was observed that FDI performance is best when water splitting is limited to just resin-resin bipolar sites. This enables effective utilization of the water split products in the regeneration process and allows maximization of flux through the media. This also ensures that entire membrane area is available for ionic diffusion limited process especially under higher flux or when low level of silica is expected.

EXPERIMENTAL DETAILS

A series of trials has been conducted, each running for 100 to 700 hours. The feed water used had an initial conductivity of 5 μs/cm that was increased until it reached 100 μs/cm. The increase of conductivity was accomplished through the external addition of sodium chloride, sodium bicarbonate, and calcium chloride. Study has been done at length with the silica addition in the feed. The objective of Experiment-01 was to study the pH profile while simulating different conditions in FDI process with changes in voltage conditions. For each case the effect of voltage and amperage has been recorded for the analysis.

The stack used was of dilute chamber of 9.5 mm and concentrate chamber of 2.5 mm, with an effective membrane size of 190 mm×350 mm. The bipolar surface area of resin to resin interface used was equivalent to half the available membrane surface area. The evaluation was done by differing composition of feed at different voltage and amperage conditions. The data selected below categorizes the voltage and amperage effects.

1) Low Voltage and Low Amperage Condition:

The feed contains impurities of cations (sodium and calcium) and anions (chloride, bicarbonates, and dissolved carbon dioxide). The feed was recirculated such that the product mixed with the feed. The conductivity and the pH of the feed were maintained by the addition of cations and anions, as mentioned above, in their chemical solution externally to compensate for the ions removed in the reject stream.

TABLE 1

| Feed Pr psi | Feed Flow cc/min | cond μs/cm | pH | Product pH | Volts V/pair | Amps Adc | conc flow cc/min | Concentrate out pH |
|---|---|---|---|---|---|---|---|---|
| 36 | 1920 | 25.7 | 7 | 9.3 | 5.25 | 0.19 | 210 | 5.6 |
| 36 | 1920 | 26 | 6.9 | 9.3 | 5 | 0.19 | 210 | 4.5 |
| 36 | 1920 | 26 | 6.5 | 9.3 | 5 | 0.19 | 210 | 4.4 |
| 36 | 1920 | 24.5 | 6.1 | 9.2 | 5 | 0.19 | 210 | 4.2 |

TABLE 1-continued

| Feed | | | | | | | conc | Concen- |
|---|---|---|---|---|---|---|---|---|
| Pr psi | Flow cc/min | cond µs/cm | pH | Product pH | Volts V/pair | Amps Adc | flow cc/min | trate out pH |
| 36 | 1920 | 27 | 7.4 | 9.2 | 5.25 | 0.19 | 210 | 3.7 |
| 36 | 1920 | 26 | 6 | 9.2 | 5.25 | 0.2 | 210 | 3.7 |
| 36 | 1920 | 25.9 | 6.3 | 9.2 | 5.25 | 0.21 | 210 | 3.6 |
| 36 | 1960 | 27 | 7 | 9.2 | 5.25 | 0.2 | 210 | 3.62 |
| 36 | 1990 | 29 | 6.5 | 9.1 | 5.25 | 0.2 | 210 | 3.55 |
| 36 | 1990 | 29 | 6 | 9.1 | 5.25 | 0.21 | 210 | 3.5 |
| 36 | 1980 | 30 | 6.1 | 9 | 5.25 | 0.2 | 210 | 3.6 |
| 36 | 1960 | 28 | 6 | 9.1 | 5.25 | 0.2 | 210 | 3.65 |
| 36 | 1960 | 29 | 5.8 | 9.1 | 5.25 | 0.2 | 210 | 3.5 |

As seen in Table 1, the feed pH was observed at a level between 6 to 6.5, with an occasional rise to 7. The voltage applied was between 4 to 6 volts/pair and the amperage consumed was very low, not exceeding 0.25 amps.

Cation removal was found to be more than 85%, while chloride removal was over 90%. Water splitting was taking place in excess. Here the product was observed to be coming out highly basic (pH more than 9), proving that the OH⁻ ions generated were not able to move towards the membranes and were coming out with the water flow in the product stream. The H⁺ ions, however, found an easy way out of the chamber and into the reject stream, making it acidic. On decreasing the voltage per pair to 4 volts/pair and reducing the extent of splitting, the product pH was found reduced towards neutral.

2) High Voltage and High Amperage Condition:

In another case, the results of which are set forth in Table 2, below, section A has a load of silica not exceeding 1 ppm, and there are no impurities other than sodium, chloride, carbonic acid, bicarbonates, or dissolved $CO_2$. This would mean that the water has an anionic load of bicarbonates chloride, silica and carbonic acid, while the cationic load is of sodium only.

The section B has the load of calcium not exceeding 1 ppm instead of silica. According to this the anionic load consists of chloride and carbonic acid, whereas the cationic load consists of sodium and calcium ions.

In all the conditions the feed pH was observed between 6 and 7.0, and the applied voltage is 10 or more volts per pair. In all the conditions the product pH, which is neutral or near neutral, is greater than the feed pH, and is and neutral or near neutral. The reject pH in all the outcomes is basic and above 9.

TABLE 2

| | Feed | Feed | | Product pH | V/ pair | Amps | conc Flow | Concentrate out | |
|---|---|---|---|---|---|---|---|---|---|
| | Pr | Flow | Cond | pH | | | | | Cond | pH |
| A-1 | 28 | 2520 | 30 | 6.5 | 7 | 10 | 1.75 | 370 | 830 | 9.9 |
| -2 | 28 | 2520 | 30 | 6.5 | 7 | 10 | 1.69 | 370 | 790 | 9.8 |
| -3 | 28 | 2080 | 4 | 6.9 | 7 | 15 | 2.22 | 390 | 920 | 10.2 |
| B-1 | 33 | 2120 | 5 | 5.9 | 6 | 15 | 1.1 | 325 | 260 | 8.2 |
| -2 | 32 | 2040 | 6.2 | 6.3 | 7 | 18 | 1.97 | 320 | 490 | 9.25 |
| -3 | 32 | 2020 | 7.8 | 6.6 | 7.1 | 14 | 1.43 | 325 | 470 | 9.47 |
| -4 | 33 | 2400 | 5 | 7.1 | 7.2 | 16 | 1.87 | 320 | 740 | 9.7 |
| -5 | 15 | 1300 | 2.5 | 6.4 | 6.9 | 14 | 1.7 | 740 | 550 | 9.5 |

The concentrated stream conductivity at the inlet is varied from 400 µs/cm to 700 µs/cm, except the B-1 data where it is only 200 µs/cm. Now comparing conditions of A-3 and B-1 in Table 2, where same voltage/pair is applied but there is difference in amperage consumed because of the difference in the conductivity of the concentrate stream. The amps drawn at higher conductivity (A-3) are double those from the other situation at (B-1). This variation has a drastic effect on pH. At one extreme where feed conductivity is greater, the pH of the reject has increased further, to a value above 10, and on the other side lower feed conductivity has reduced the pH to a value below 9. This indicates various means of controlling water splitting to control deionization in second stage.

Voltage of more than 10 volts/pair is higher to make the anion active, and if the amperage is increased by secondary means (other than voltage), the same voltage (as in the case of A-3) is responsible for more transfer of OH⁻ ions in the reject stream. In such a system 10 volts and above can be termed high voltage, and amperage above 1.5 can be said to be high amperage.

The two states of low voltage-low amperage and high voltage-high amperage have a significant role to play in creating the FDI system and became the basis for further work.

Stacks in Series:

Case-1

The feed water has an impurity of calcium ions. The feed pH is between 6 and 6.5 with an occasional rise up to 7.5.

All the calcium ions are separated in the reject side such that the product received contains no calcium and the reject side is loaded with the calcium ions. There are fewer calcium ions in the feed side than in the reject side. Precipitation in the reject side should be avoided, and to achieve this condition, the reject side pH should be slightly acidic; more H⁺ ions should be transferred along with the cations. Maintaining pH below neutral would be enough to prevent calcium precipitation; any more would be a waste of energy.

On the other side, in the feed chamber, basicity needs to be avoided. If the pH of the product is neutral or near neutral, the process would run more smoothly. Because more H⁺ ions are used in the reject side, that many more OH⁻ ions would find their way into the product after getting consumed, so if the product pH is not neutral, having it at slightly more than 7 would not be detrimental at the outlet point.

Reject: pH neutral→towards acidic

Product: pH neutal→towards slightly basic

If the feed contains both the impurities of anionic ions and cationic ions mentioned in the two cases together, which is a mix of strongly and weakly ionized, the most conducive situations required are contrary to each other. The reject pH is suitable if it is acidic in one case and if it is basic in another. The methods to derive the individual conditions are different where operating conditions are different.

This is the basis for the development of the fractional deionization process. It is a single stack unit where feedenters the stack and in its path it encounters the first electrical stage where the object is to remove the hardness (cationic impurities) to the maximum extent possible. The first conditions of low voltage and low amperage are used here, which brings the calcium content from 5 ppm to less than 1 ppm. The reject pH level does not allow the hardness to precipitate from the feed. The OH$^-$ ions generated in the absence of sufficient amperage do not ionize silica, and therefore silica removal is negligible. Generation of some OH$^-$ ions in the product chamber tends to raise the alkalinity, which partly would convert bicarbonate to carbonate.

Stage-1 Effect

The stack used had the following specifications: Effective membrane dimensions were 190 mm×350 mm. Dilute chamber thickness of 10 mm and concentrate chamber of 2.0 mm. Resin to resin bipolar surface area equals to the half of the membrane surface area. Demineralized water was taken with conductivity of 4 μs/cm. Calcium hardness was added externally to give the feed a concentration 5 ppm of $CaCO_3$. Concentrate conductivity was maintained at 200 μs/cm. Voltage applied was 4 to 5 volts per pair.

EXAMPLE-01

Two normal stacks, each of two cell pairs, made the initial dual voltage system with dilute chambers separately and connecting them in series such that feed and concentrate were fed in the first stack, and the product and the reject of first stack were the feed for the second stack.

The effective membrane characteristics in the stacks used for all the trial runs were:

Dimensions: 190 mm wide and 350 mm long.
Dilute chambers: two numbers in each stage.
Operating membrane surface area 1330 cm$^2$ in each stage.
Total surface area 2660 cm$^2$ in both the stages.
Bed length 0.7 m per stage and 1.4 m in total.
Product flow rate achieved in this design was 0.56 to 0.71 cm$^3$ per minute per cm$^2$ of surface area. The results of this trial are set forth in Table 3.

The first stage of the multi-stage fractional deionization system was operated at low voltage and low amperage. The product pH was observed to be greater than 8, and the reject pH was as low as 3.6-4.2 Hardness decreased from 6 ppm to less than 1 ppm as $CaCO_3$. The conductivity and thus the salt reduction in this stage is more than 70%, which is less than we would expect even when the reduction of calcium is more than 85%. Because of lower voltage, the OH$^-$ ions generated in the dilute compartment are not mobile and do not migrate to the reject side and find a way out in the product. The conversion of carbonic acid to the higher form of bi-carbonate is caused by the OH$^-$ ions, which are observed by the rise in the alkalinity of the product to that of the feed, but the amperage is still less to allow motion and transfer the ions through the membrane.

Case-2

The Feed Water has Impurities of Silica and Carbonic Acid. The Feed pH is Between 6 and 6.5.

All the anionic impurities are separated from the feed to give a product free of silica and carbonic acid, and the reject collects all the separated ions. For this to happen, enough OH$^-$ ions have to be produced in the feed chamber for the reaction to occur. High energy is also required so that the concentration is maintained at a high enough level on the membrane surface for easy transfer. This would allow more OH$^-$ ions to transfer across as well. As a result the pH of the reject side would be basic, while the product side would remain neutral.

Reject: pH neutral→towards basic.
Product: pH slightly acidic→towards neutral.

Stage-2 Effect

The feed in this stage contains as impurities primarily the weakly ionized species that were not eliminated in the first stage. As was previously explained, both silica and carbonic acid groups require OH$^-$ ions and high energy for ionization and movement. The voltage required for the second stage is more than 10 volts/pair.

TABLE 3

| Feed | | | | Product | | | | Conc | Conc out | | Hardness Calcium as $CaCO_3$ | |
|---|---|---|---|---|---|---|---|---|---|---|---|---|
| Pr psi | Flow cc/min | Cond us/cm | pH | Cond us/cm | pH | Volts V/pair | Amps adc | Flow cc/min | Cond us/cm | pH | Feed ppm | Product ppm |
| 36 | 1800 | 22.3 | 6.5 | 4.6 | 8.56 | 4.75 | 0.19 | 720 | 280 | 3.96 | | |
| 36 | 1800 | 21.8 | 6.5 | 4.23 | 8.5 | 4.75 | 0.18 | 720 | 280 | 3.9 | 6 | 0.54 |
| 36 | 1800 | 22 | 6 | 4 | 8.4 | 4.75 | 0.18 | 720 | 290 | 3.76 | | |
| 36 | 1800 | 21.7 | 6.4 | 4.24 | 8.8 | 4.75 | 0.18 | 720 | 290 | 3.85 | 6 | 0.69 |
| 36 | 1800 | 22 | 6.6 | 4.2 | 8.6 | 4.75 | 0.18 | 720 | 300 | 3.84 | 6 | 0.51 |
| 36 | 1730 | 22.3 | 6.1 | 5.2 | 8.8 | 4.5 | 0.16 | 710 | 270 | 4.16 | 6 | 0.67 |
| 36 | 1740 | 22 | 6 | 5.2 | 8.76 | 4.5 | 0.16 | 710 | 270 | 4.06 | | |
| 36 | 1740 | 21.6 | 6.4 | 4.6 | 8.66 | 4.5 | 0.16 | 710 | 270 | 4 | 6 | 0.45 |
| 36 | 1760 | 20.6 | 6 | 4.4 | 8.5 | 4.5 | 0.17 | 710 | 270 | 3.86 | | |
| 36 | 1760 | 22 | 6 | 4.5 | 8.6 | 4.5 | 0.18 | 710 | 270 | 3.8 | 6.5 | 0.67 |
| 36 | 1760 | 28 | 6.6 | 7.8 | 8.8 | 4.5 | 0.19 | 710 | 280 | 3.88 | | |
| 36 | 1760 | 28.5 | 6.7 | 7.9 | 8.8 | 4.5 | 0.19 | 710 | 310 | 4.3 | 6 | 0.78 |
| 36 | 1760 | 29.2 | 6.5 | 8.2 | 8.9 | 4.5 | 0.2 | 710 | 290 | 4.2 | | |

We use the stack of the same specification but with the water having conductivity of 5 μs/cm. Silica is dosed such that in feed it is 1 ppm. The dose is increased over 1 ppm only for a very brief time. The water contains dissolved $CO_2$, but no hardness is present this time. Strongly ionized sodium was present from the source used to introduce silica. This trial is set forth in Table 4-A.

selectively with the silica leaving the carbonic acid. Little or no removal of carbonic acid immediately makes the resistivity of the product lower.

TABLE 4-A

| | Feed Pressure psi | Feed Flow cc/min | Feed Cond us/cm | Reject in Cond us/cm | Conc Flow | Volts V/pair | Amps Adc | Conc out pH | Silica in Feed ppb | Silica in Product ppb | Resistivity Mega Ohms |
|---|---|---|---|---|---|---|---|---|---|---|---|
| S-1 | | | | | | | | | | | |
| 1 | 36 | 2100 | 2.5 | 400 | 300 | 13.5 | 2.66 | 9.6 | 350 | Less | 18 |
| 2 | 36 | 2100 | 6.5 | 400 | 300 | 13.75 | 2.75 | 9.31 | 700 | than | 17.75 |
| 3 | 36 | 2130 | 7.6 | 400 | 300 | 14.25 | 2.7 | 9.21 | 1000 | 20 ppb | 17.5 |
| 4 | 36 | 2100 | 7 | 400 | 300 | 14 | 2.71 | 9.15 | 1000 | | 17.2 |
| 5 | 36 | 2130 | 7 | 400 | 300 | 14.5 | 2.86 | 9.16 | 1000 | | 17 |
| S-2 | | | | | | | | | | | |
| 1 | 36 | 2060 | 10 | 400 | 570 | 13.75 | 3.04 | 9.87 | 1400 | Less | 17.8 |
| 2 | 36 | 2060 | 10 | 400 | 570 | 13.5 | 3.16 | 9.83 | 1400 | than | 16 |
| 3 | 36 | 2060 | 7 | 400 | 570 | 13.5 | 3.14 | 9.86 | 1400 | 20 ppb | 13 |
| 4 | 36 | 2060 | 7 | 400 | 570 | 13.5 | 3.14 | 9.81 | 1400 | | 12.8 |
| S-3 | | | | | | | | | | | |
| 1 | 36 | 2000 | 6.1 | 400 | 510 | 11.5 | 2.44 | 9.82 | 1000 | Less | 18 |
| 2 | 36 | 2020 | 6.5 | 400 | 510 | 13.5 | 3.12 | 9.83 | 1000 | than | 17.6 |
| 3 | 36 | 2020 | 6.8 | 400 | 510 | 16.25 | 4.05 | 10.1 | 1000 | 20 ppb | 16.9 |
| 4 | 36 | 2020 | 6.8 | 400 | 510 | 15 | 3.79 | 9.96 | 1000 | | 15.8 |
| 5 | 36 | 2020 | 6.8 | 400 | 510 | 17.25 | 4.8 | 10.1 | 1000 | Less | 15 |
| 6 | 36 | 2020 | 6.8 | 400 | 510 | 16.75 | 4.31 | 10.1 | 1000 | than | 14 |
| 7 | 36 | 2020 | 6.8 | 400 | 510 | 16 | 4.18 | 9.93 | 1000 | 20 ppb | 12.3 |
| 8 | 36 | 2040 | 6.8 | 400 | 510 | 16 | 4.6 | 10.1 | 1000 | | 11.6 |

The objective in the second stage effect is to eliminate all the residual impurities and obtain a product resistivity of 18 Mega ohms.

The bed was regenerated and then the addition of a feed stream started that included the silica dosage. The stack was run for more than 100 hours. The conductivity of the reject in water was maintained at 400 μs/cm. A voltage of between 11 and 17 volts/pair was applied. The voltage and the reject-in conductivity together were responsible to give the amperage consumed on the higher side of more than 2.5 amps.

The table is broken in three parts to explain the effect that happens in such a situation. All of the conditions fulfill the high voltage and high amperage condition.

S-1

The addition was started when on re-circulation the product's continuing resistivity was at least 18 MΩ. Silica addition was started and maintained at a level of 1000 ppb in the feed. The silica level was monitored by the Hack spectrophotometer and was observed to be less than 20 ppb at all operating temperatures between 25 and 40° C. Though the silica content was found to be reduced in the product, the product resistivity started falling from 18 to 17 MΩ. Upon ceasing addition of silica, the resistivity rose back to 18 MΩ.

The change in resistivity occurred because of the carbonic acid present and the high voltage and high amperage used. At the high voltage and high amperage condition, the OH$^-$ ion mobility becomes very fast and their trajectory towards the flow direction becomes shorter, allowing faster transfer through the membrane but without ideal transfer through the water. The OH$^-$ ions available in the shorter period react

S-2

The resistivity that fell down to 17 MΩ became normal within an hour of being run without the addition of silica. Silica addition was again started with silica level slightly more than 1 ppm; this resulted in an increase of amperage to more than 3 amps. The resistivity drop was sharper this time, and on stopping silica addition the resistivity improved immediately. Once again it proved that greater current that results in water splitting more than necessary is more undesirable for the resistivity, even if the silica is controlled.

S-3

Similar to S-2, the current consumed was raised to 4 amps to ensure all values of amperage above that level are not desirable. The result was the same.

In all the three segments the OH$^-$ ion transfer to the reject compartment can be seen by the pH condition mentioned. The pH, which was around 9.2 at the amperage condition of 2.5 in S-1, went up to pH of 9.8 at amperage of 3 or more in S-2. With further increase in the current above 4 the pH was found to more than 10. This condition results from the excessive transfer of OH$^-$ ions developed in the dilute chamber and degrades the product resistivity even when the silica is controlled.

The high voltage state is required because the water contains weakly ionized ions.

However an excess of it does not make the operation more efficient but on the contrary is counter productive.

TABLE 4-B

| | Feed Pressure psi | Feed Flow cc/min | Feed Cond us/cm | Reject in Cond us/cm | Conc Flow | Volts V/pair | Amps Adc | Conc out pH | Silica in Feed Ppb | Silica in Product ppb | Resistivity Mega Ohms |
|---|---|---|---|---|---|---|---|---|---|---|---|
| S-1 | | | | | | | | | | | |
| 1 | 24 | 2080 | 6 | 100 | 390 | 16.75 | 1 | 8.9 | 1000 | Less than 20 ppb | 18.35 |
| 2 | 24 | 2120 | 6 | 100 | 390 | 17 | 1 | 9.09 | 1000 | | 18.2 |
| 3 | 24 | 2100 | 6 | 100 | 390 | 17 | 0.99 | 9.01 | 1000 | | 18.25 |
| 4 | 24 | 2180 | 6 | 100 | 385 | 16.5 | 0.99 | 9.26 | 1000 | | 18.45 |
| S-2 | | | | | | | | | | | |
| 1 | 24 | 2080 | 11 | 100 | 370 | 16.75 | 1.02 | 9.26 | 1000 | Less than 20 ppb | 18.3 |
| 2 | 24 | 2140 | 11 | 100 | 365 | 16.75 | 1.02 | 9.36 | 1000 | | 18.35 |
| 3 | 24 | 2130 | 11 | 100 | 365 | 16.75 | 1.06 | 9.48 | 1000 | | 18.35 |
| 4 | 28 | 2480 | 11 | 100 | 400 | 16.75 | 1.05 | 9.4 | 1000 | | 18.29 |
| 5 | 28 | 2460 | 11 | 100 | 400 | 16.75 | 1 | 9.35 | 1000 | | 18.4 |
| S-3 | | | | | | | | | | | |
| 1 | 28 | 2440 | 10 | 100 | 395 | 17.25 | 0.89 | 9.19 | 1000 | Less than 20 ppb | 18.4 |
| 2 | 28 | 2420 | 8 | 100 | 400 | 17.25 | 0.82 | 8.91 | 1000 | | 18.3 |
| 3 | 28 | 2400 | 6.8 | 100 | 380 | 16.25 | 0.75 | 8.98 | | | 18 |

Table 4-B has three sets of readings. The modification here was to reduce the amperage at the elevated voltage by reducing the conductivity of reject in stream. The conductivity was reduced from 400 to 100 μs/cm. The amperage, which had ranged from 2.5 to 4.5 amps, was reduced to 1 amp. The three sets have small variations of flow conditions.

In S-1 the feed low is around 2100 cc/min and feed conductivity of 6 μs/cm.

In S-2 the flow remains constant at 2100 cc/min but the conductivity is raised to 11 μs/cm and subsequently flow is also raised to 2400 cc/min.

In S-3 there is elevated flow condition.

Within all these variations, the voltage applied was 16.5 to 17.5 volts/pair and the amperage consumed was around 1 amps. The reject pH was found to be from 8.9 to 9.2. It can be observed that the pH had risen to 9.4 but had come down to the lower level. The silica in the product was maintained below 20 ppb, and simultaneously the resistivity of the product was observed equal to 18 plus MΩ cm. The stack was run for more than 50 hours without any deterioration in the quality.

Here hardness of more than 5 ppm as $CaCO_3$ has been tackled in the first stage at a low voltage and ampere condition. Here silica, if present, is not removed, and carbonic acid partially converts to the stronger ionic group as bicarbonate, but the bicarbonate is still within the water. The product of the first stage, when is subjected to the second stage where the voltage and the amperage are different and higher, is stripped of the remaining impurities to give a product of highest purity. The two stages can be combined by using different stacks connected in series or by using a specially designed stack that can accommodate two electrical stages. Both the configurations were tried to affirm our results.

Figure 4:
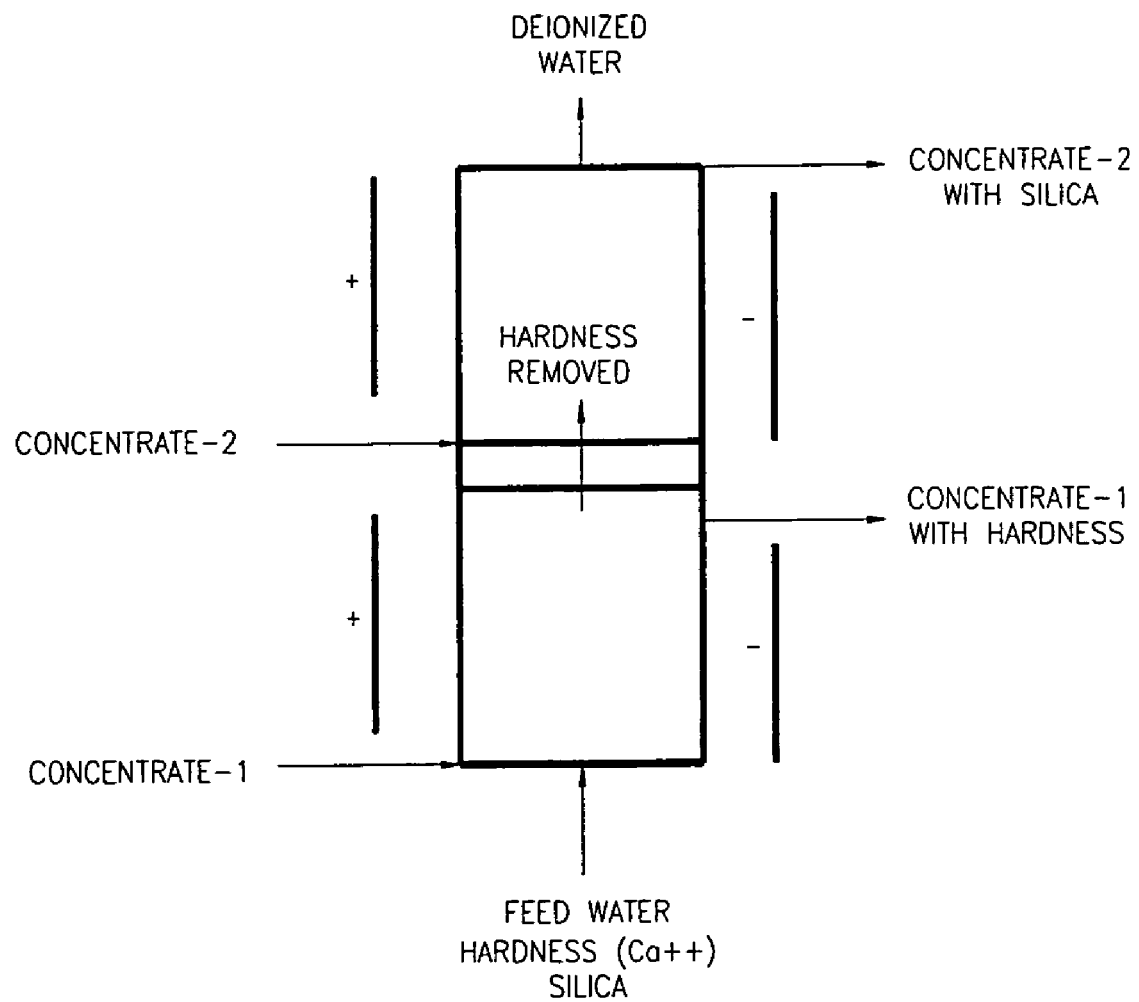
FIG. 4 is an illustration of one embodiment of the instant invention.

Dual Voltage FDI:

FIG. 4 illustrates one embodiment of the current invention. For ease of operation a new stack was designed such that water would flow through a specially made design where it could be subjected to two different voltages in a single path. The first half path is subjected to one type of voltage and is the first stage of the fractional deionization system, responsible for removing the strongly charged ion and the hardness. The second half is a high voltage area responsible for removal of traces of remaining ionic impurities including weakly charged ions.

EXAMPLE-02

The stack characteristics of this design were as follows:

Membrane dimensions: 190 mm wide and 350 mm long.

Dilute chambers: one and half numbers in each stage.

Operating membrane surface area 998 $cm^2$ in each stage.

Total surface area 1996 $cm^2$ in both the stages.

Bed length 0.5 meter per stage and 1.0 meter in total.

In the modified stack for identical cell design, with a continuation of flow from first stage to the second a provision was made to collect a water sample of the product of Stage-1 (the feed for the second stage) when required for the analysis.

The modified two-in-one stack was designed and run as follows: Two separate water circulation loops were made. One feed circulation loop was connected at the inlet of the stack. The water outlet from this stream was the final product, which was put back in the tank for recirculation. The feed tank allowed the addition of hardness in the form of calcium chloride and/or sodium chloride and sodium bicarbonate in case the feed conductivity needed to be increased. The other loop was of concentrate feed connected to the reject compartment of the stack of both stages. Reject coming out of the stack was diluted to control the concentrate conductivity before being returned to the stream. Initially the stack was started with minimum feed conductivity for several hours so that the stack was set and regenerated. With the relation of membrane surface area mentioned above and given the experience with the standard stack system, the flow rate expected was between 1200 and 1400 cm³ per minute.

The stack was put in operation with following conditions and expectations:
1—Feed hardness: 5 ppm as $CaCO_3$.
2—Feed conductivity: 13 to 16 µs/cm.
3—Product first stage: hardness less than 1 ppm.
4—Product second stage: permissible hardness.
5—First stage: low voltage and second stage: high voltage.

The stack performance was observed for one of the runs as follows:
a) The stack had run initially for 80 hours, including its stabilizing period;
b) The feed flow was maintained at 1200 cm³ per minute and feed conductivity of 12 to 14 µs/cm, for next 40 hours. (See Table 5, below);
c) The feed conductivity was raised to 60 µs/cm by the addition of sodium chloride, keeping the hardness load of 5 ppm in the feed from 41 hours onwards.

ii. The hardness was also measured in the reject stream, which is the carrier of the removed salts for finding the material balance, and was found to be correct.

iii. The pH of the reject of stage-1 was found to be acidic, confirming that the salts removed would not precipitate in the compartment. The pH for the reject of stage-2 was maintained as alkaline, confirming the theory of ions splitting at the higher voltage required for the removal of the weakly charged remaining ions.

iv. The product resistivity was maintained between 16 and 13 MΩcm. The major separation having taken place in the first stage and in the absence of any conducting material being supplied in the second stage, the resistivity varied from 16 to 13 MΩ cm.

v. Point four was confirmed by increasing the feed conductivity by the addition of sodium chloride for 60

TABLE 5

| Stack Running Hrs. Feed Flow 1200 | Feed Cond us/cm | PH cc/min | Product-2 Cond M ohm | pH | Reject 1 pH | Reject 2 PH | Hardness analysis as Ca CO₃ |  |  | Reject stream. |  |  |
|---|---|---|---|---|---|---|---|---|---|---|---|---|
| | | | | | | | Feed ppm | pro-I ppm | pro-II ppm | feed ppm | rej-1 ppm | rej-II ppm |
| 2 | 12 | 6.1 | 16.67 | 6.6 | 4.1 | 10.0 | 4.5 | 0.5 | 0.029 | 1.25 | 19.0 | 2.0 |
| 4 | 12 | 6.0 | 15.63 | 6.5 | 4.0 | 10.2 | 5.0 | 0.5 | 0.023 | 1.5 | 20.5 | 2.0 |
| 6 | 13 | 6.0 | 15.87 | 6.4 | 4.0 | 10.0 | 6.5 | 0.5 | 0.021 | 1.5 | 23.5 | 2.5 |
| 8 | 13 | 6.0 | 15.63 | 6.4 | 3.9 | 9.9 | 4.5 | 0.5 | 0.024 | 2.5 | 24.0 | 4.0 |
| 10 | 13 | 6.3 | 15.38 | 6.5 | 4.0 | 10.1 | 5.0 | 0.5 | 0.025 | 1.5 | 24.0 | 2.5 |
| 12 | 13 | 6 | 15.87 | 6.4 | 3.8 | 10.1 | 5.5 | 0.5 | 0.020 | 1 | 37 | 3 |
| 13 | 13 | 6.1 | 15.87 | 6.5 | 3.8 | 10.4 | 5 | 0.5 | 0.021 | 1 | 38 | 2 |
| 15 | 12 | 6.1 | 15.63 | 6.5 | 3.5 | 10.4 | 5.5 | 0.5 | 0.023 | 1.5 | 30 | 2.5 |
| 17 | 12 | 6 | 15.38 | 6.4 | 3.6 | 10.3 | 5.0 | 0.5 | 0.025 | 1.5 | 29.5 | 2 |
| 18 | 11 | 6.1 | 15.38 | 6.5 | 3.5 | 10.3 | 5 | 0.5 | 0.023 | 1.5 | 30.5 | 2 |
| 20 | 12 | 6.3 | 14.93 | 6.6 | 3.5 | 10 | 4.5 | 0.5 | 0.024 | 1.5 | 34 | 2 |
| 21 | 13 | 6.0 | 14.29 | 6.4 | 4.0 | 9.5 | 6.0 | 0.5 | 0.025 | 2.0 | 23 | 2.0 |
| 22 | 14 | 6.0 | 14.49 | 6.4 | 4.4 | 10.1 | 5.0 | 0.5 | 0.026 | 2.0 | 19 | 2.5 |
| 24 | 14 | 6.1 | 14.71 | 6.5 | 4.1 | 10.3 | 4.5 | 0.5 | 0.024 | 1.5 | 17.5 | 2.5 |
| 25 | 14 | 6.1 | 15.15 | 6.5 | 3.9 | 10.1 | 5.5 | 0.5 | 0.025 | 1.5 | 17 | 2.0 |
| 27 | 14 | 6.1 | 15.15 | 6.9 | 3.9 | 10.2 | 4.5 | 0.5 | 0.023 | 1.5 | 20 | 2.0 |
| 29 | 14 | 5.9 | 14.93 | 6.7 | 4.0 | 10.2 | 5.0 | 0.5 | 0.024 | 1.5 | 22 | 2.0 |
| 31 | 14 | 6.0 | 12.99 | 7.0 | 3.8 | 10.3 | 4.5 | 0.5 | 0.024 | 2.0 | 23 | 2.5 |
| 33 | 14 | 6.2 | 13.51 | 6.9 | 4.4 | 10.2 | 5.0 | 0.5 | 0.023 | 1.5 | 22 | 2.0 |
| 35 | 14 | 6.2 | 13.51 | 6.7 | 4.2 | 10.2 | 5.0 | 0.5 | 0.025 | 1.5 | 21 | 2.5 |
| 36 | 15 | 6.1 | 13.51 | 6.9 | 4.3 | 10.2 | 4.0 | 0.5 | 0.021 | 2.0 | 19 | 2.5 |
| 39 | 14 | 6.1 | 12.82 | 6.8 | 4.4 | 9.4 | 5.6 | 0.5 | 0.020 | 2 | 20.6 | 2.8 |
| 41 | 18 | 6.1 | 12.99 | 6.7 | 4.3 | 10 | 5 | 0.5 | 0.024 | 1.5 | 21 | 1.8 |
| 43 | 60 | 6.1 | 12.05 | 6.9 | 4.5 | 10.2 | 4 | 0.5 | 0.021 | 1.5 | 19 | 1.9 |
| 46 | 100 | 6.0 | 13.51 | 6.5 | 4.9 | 10.6 | 4.5 | 0.5 | 0.020 | 1.2 | 21 | 2 |
| 51 | 17.5 | 6 | 17.24 | 6.3 | 4.4 | 10.4 | 4.5 | 0.3 | 0.021 | 1 | 15.8 | 1.8 |
| 52 | 16 | 6.1 | 17.54 | 6.7 | 4.1 | 10.4 | 4.4 | 0.2 | 0.020 | 1 | 15 | 1.6 |
| 54 | 16 | 6.1 | 17.24 | 6.5 | 4.4 | 10.5 | 5 | 0.4 | 0.020 | 1.2 | 17 | 2 |
| 56 | 17 | 6 | 15.15 | 6.7 | 4.19 | 10.4 | 4.5 | 0.4 | 0.022 | 1.2 | 18 | 2.2 |
| 60 | 55 | 6.0 | 16.13 | 6.5 | 5.4 | 10.5 | 5.1 | 0.5 | 0.023 | 1.2 | 20 | 2.2 |
| 62 | 64 | 6.1 | 17.24 | 6.7 | 5.8 | 10.4 | 4.6 | 0.5 | 0.021 | 2 | 26 | 2.9 |
| 64 | 60 | 6.1 | 16.39 | 6.7 | 5.7 | 10.4 | 4.2 | 0.5 | 0.02 | 1.5 | 24 | 2.2 |
| 66 | 61 | 6.0 | 17.86 | 6.8 | 5.1 | 10.3 | 4.5 | 0.5 | 0.024 | 1.6 | 24 | 2 |
| 67 | 64 | 6.1 | 16.95 | 6.8 | 5.1 | 10.3 | | | | | | |
| 68 | 68 | 6 | 17.86 | 6.5 | 4.9 | 10.4 | | | | | | |

The hardness and conductivity were measured along with pH of each stream. The result reflects the following:

i. The hardness in the feed was 5±1 ppm, whereas the rejection in the first stage was only 90% of that and never crossed 0.5 ppm. The final product was analyzed as less than 24 ppb of hardness.

µs/cm. All other parameters remained the same except the product resistivity, which improved to 17 MΩcm.

The process following the required conditions, the feed flow was increased to 1500 cm³ per minute, while the feed conductivity was maintained at the raised level of 60 µs/cm.

The data for next 80 hours of operation was as below:

TABLE 6

| Stack Running Hrs. Feed Flow | Feed cond us/cm 1500 | pH | Product-2 cond M ohm | pH | Reject 1 pH | Reject 2 pH | Hardness analysis as Ca CO₃ | | | Reject stream. | | |
|---|---|---|---|---|---|---|---|---|---|---|---|---|
| | | | | | | | feed ppm | pro-I ppm | pro-II ppm | feed ppm | rej-1 ppm | rej-II ppm |
| 70 | 62 | 6 | 16.67 | 6.7 | 4.9 | 10 | 5.4 | 0.6 | 0.022 | 1.5 | 18 | 2 |
| 72 | 60 | 6 | 16.67 | 6.2 | 4.6 | 10.1 | 5 | 0.7 | 0.023 | 1.5 | 17 | 1.8 |
| 74 | 58 | 6 | 16.95 | 6.2 | 4.6 | 10 | 4.8 | 0.6 | 0.02 | 1.2 | 15 | 1.8 |
| 76 | 60 | 6.1 | 17.54 | 6.3 | 4.8 | 9.9 | 5.4 | 0.6 | 0.02 | 1.2 | 16 | 2 |
| 80 | 61 | 6.1 | 16.95 | 6.6 | 5.9 | 7.9 | 5 | 0.8 | 0.02 | 1.2 | 10 | 1.8 |
| 82 | 61 | 6 | 16.95 | 6.7 | 8.2 | 7 | 5.5 | 0.8 | 0.019 | 1.4 | 12 | 2.5 |
| 84 | 60 | 6.2 | 17.24 | 6.2 | 9.2 | 6.5 | 5 | 0.8 | 0.02 | 1.7 | 14.5 | 2.5 |
| 86 | 67 | 6 | 17.24 | 6.5 | 8.3 | 5.9 | 5 | 0.5 | 0.021 | 2.1 | 15.5 | 3 |
| 89 | 65 | 6.4 | 17.24 | 7.2 | 9.4 | 5.8 | 5 | 1 | 0.02 | 3.5 | 19 | 3.5 |
| 91 | 60 | 6.2 | 17.54 | 6.9 | 8 | 6 | 4.5 | 0.8 | 0.022 | 2.8 | 17 | 3.2 |
| 93 | 65 | 6.2 | 17.54 | 6.7 | 8.2 | 6.5 | 5.5 | 0.5 | 0.02 | 2.5 | 18 | 3.5 |
| 97 | 60 | 6.1 | 16.95 | 6.8 | 4.6 | 4.2 | 5.5 | 0.5 | 0.022 | 2.6 | 17 | 4.2 |
| 99 | 60 | 6.0 | 17.24 | 6.6 | 4.8 | 5 | 6 | 1 | 0.023 | 3.2 | 19 | 5 |
| 101 | 60 | 6.3 | 17.24 | 7.0 | 6 | 7.4 | 4.5 | 0.8 | 0.021 | 2.2 | 16 | 3.4 |
| 105 | 60 | 6.3 | 17.24 | 6.9 | 5.8 | 9.4 | 5.2 | 0.8 | 0.023 | 2.5 | 19 | 4 |
| 107 | 60 | 6.2 | 16.95 | 6.9 | 4.3 | 6.9 | 5.6 | 0.8 | 0.022 | 2.6 | 15 | 3.8 |
| 109 | 60 | 6.3 | 16.95 | 6.9 | 4.7 | 6.2 | 4.6 | 0.5 | 0.021 | 3.6 | 14 | 4.4 |
| 111 | 60 | 6.2 | 16.67 | 7.2 | 5.5 | 6.5 | 4.5 | 0.8 | 0.022 | 8.5 | 21 | 10 |
| 114 | 67 | 6.4 | 16.39 | 6.9 | 5.7 | 7 | 5 | 1 | 0.023 | 10 | 20 | 11 |
| 116 | 60 | 6.3 | 16.39 | 7.1 | 5.4 | 7 | 4.5 | 1 | 0.02 | 8.5 | 18 | 10 |
| 118 | 60 | 6.6 | 16.67 | 7.2 | 4.7 | 9.1 | 5.2 | 0.8 | 0.019 | 9.5 | 21 | 12 |
| 120 | 61 | 6.1 | 16.67 | 7 | 4.5 | 9.6 | 5.4 | 0.5 | 0.018 | 10 | 22 | 13 |
| 123 | 60 | 6.3 | 14.71 | 7.1 | 4.2 | 10.1 | 4.6 | 0.6 | 0.02 | 9 | 19 | 11 |
| 125 | 60 | 6.1 | 14.71 | 7.4 | 4 | 9.96 | 4.4 | 0.8 | 0.021 | 9.5 | 23 | 12.5 |
| 127 | 64 | 6.2 | 14.93 | 6.9 | 3.9 | 9.8 | 5.2 | 0.8 | 0.02 | 10 | 22 | 13 |
| 129 | 65 | 6.2 | 15.63 | 7.2 | 4.1 | 10.1 | 5.5 | 0.8 | 0.019 | 10 | 24.5 | 12 |
| 132 | 63 | 5.4 | 16.13 | 7.3 | 4.9 | 10 | 5 | 0.6 | 0.022 | 9 | 12 | 22 |
| 134 | 63 | 5.6 | 15.38 | 7.3 | 4.8 | 10 | 5.5 | 0.6 | 0.02 | 9.5 | 12 | 19.5 |
| 139 | 63 | 5.6 | 16.67 | 7.2 | 4.3 | 10.4 | 5.5 | 1 | 0.022 | 9.5 | 16.5 | 18 |
| 141 | 67 | 6.3 | 13.89 | 7.1 | 4.2 | 10.5 | 5.5 | 0.8 | 0.02 | 10 | 16 | 18 |
| 145 | 60 | 6.5 | 13.51 | 7.5 | 4.3 | 10.6 | 4.5 | 0.5 | 0.02 | 9 | 15.5 | 20 |
| 147 | 30 | 6.9 | 15.87 | 7.5 | 4.8 | 10.6 | 6 | 0.8 | 0.023 | 3 | 10 | 9 |
| 149 | 30 | 6.6 | 15.87 | 7.1 | 4.4 | 10.7 | 5.5 | 0.8 | 0.025 | 2.5 | 11 | 6 |
| 151 | 19 | 6.9 | 15.87 | 7 | 4.2 | 10.8 | 5.5 | 0.5 | 0.024 | 2 | 10 | 7 | i. The product resistivity remained in order.

iii. All other parameters mentioned above were as required, and the salt balance across the membrane was in order.

The process was repeated many times to confirm the process in this modified design.

The modified design thus was found to give the following advantages:

1) The product resistivity was achievable as earlier or better.
2) The flow rate achieved per unit area of the membrane was greater.
3) Better mixing of the water in the process gave better and more stable results.
4) The design was mechanically sturdy, with minimum probability of mechanical leakage.
5) Because separation of highly conducting ions and weakly conducting ions occurred at different points in the system, the effective load was distributed and the power consumption fell sharply per unit volume of water processed.

EXAMPLE-03

Another experiment was conducted with a four cell pair configuration. This system had a provision of drawing the intermediate product from the stage-1 for analysis of water that was taken as feed for the final stage of the system. After confirming the hardness removal without any difficulties, the focus was to find the level of removal of silica that was present in the feed.

The bipolar surface area maintained between dissimilar resin and membrane were:

1) Anion resin v/s cation resin: 140 cm².
2) Cation membrane and anion resin: 198 cm².
3) Anion membrane v/s cation resin: 99 cm².
4) The flow rate run in a three dilute chamber system was kept between 1700 cc/min and 2000 cc/min.

The stack was put in operation with following conditions,

1) Feed conductivity: 15 to 20 μ/cm.
2) Feed hardness: 5 ppm as $CaCO_3$.
3) Feed silica as $SiO_2$: 200-225 ppb.

The direct current applied in the primary stage was equal to 3 to 5 volts/pair, while the voltage applied in the final stage was in the range of 15 to 18 volts/pair. Continuous monitoring was carried out for hardness leakage, residual silica, and resistivity of the product.

Silica Removal

Figure 5:
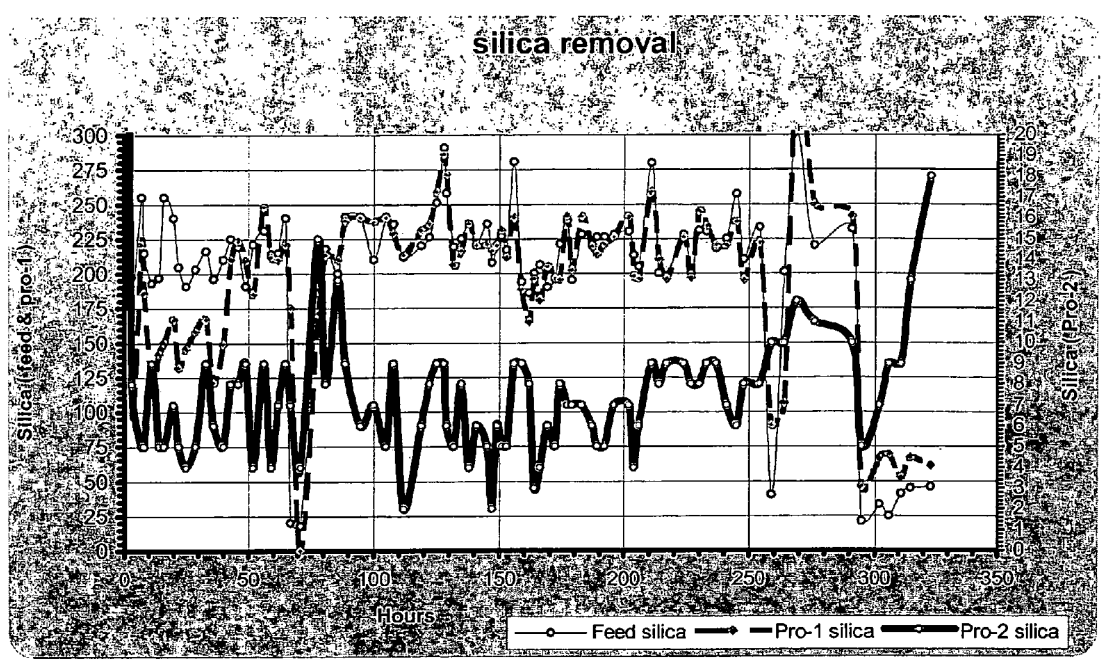
FIG. 5 is a graph tracking silica removal from a product over time.

The graphical representation of silica removal results for more than 300 hours is set forth in FIG. 5.

In examining FIG. 5, note that the left side of the y-axis indicates the silica values maintained in the feed and the values obtained in the intermediate stage, which are shown in continuous light line and dotted dark lines respectively. Both the values run at almost the same level indicating that silica removal is negligible in the primary stage of the system. The right side of the y-axis is for the residual silica as measured in the final product. For the three hundred hours run the minimum silica value obtained was 2 ppb, and the maximum value obtained was only as high as 15 ppb. The average residual silica was below 10 ppb.

Product Resistivity

Figure 6:
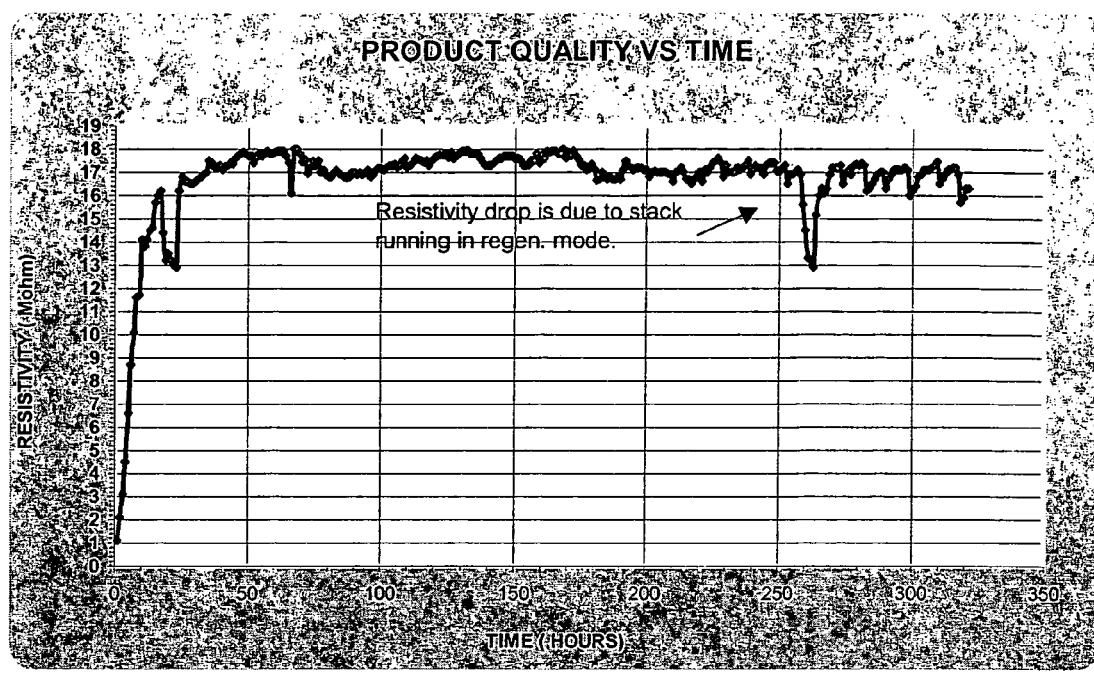
FIG. 6 is a graph tracking product quality as a function of resistivity over time.

FIG. 6, which tracks product resistivity over time, shows that after the initial stabilizing period of 20 to 25 hours the product was maintained at 17 MΩ cms and above for the entire operational length of 300 hours.

EXAMPLE-04

Another experiment was conducted in a four cell pair identical configuration. The flow rate run in a three dilute chamber systems was kept between 1700 cc/min and 2000 cc/min. Initially the stack was subjected to a feed with 2 ppm hardness and a silica impurity of 200 ppb; subsequently other strongly ionized anions and cations were added to allow calculation of their removal in each stage of the system. The objective of the experiment was to evaluate specific ionic reductions in different stages of FDI process.

Stack performance for more than 300 hours is set forth in Table 7.

TABLE 7

| Stack Running hrs. | Flow cc/min | Feed cond us/cm | pH | pro-1 cond us/cm | PH | pro-2 Resistivity Mohms | pH | Volts V-1 vdc | Amps A-1 adc | Volts V-2 vdc | Amps A-2 adc | Hrs | |
|---|---|---|---|---|---|---|---|---|---|---|---|---|---|
| Initial 60 hours were stack stabilizing period |
| 57 | 1600 | 20 | 7.2 | 0.8 | 7.4 | 15.9 | 6.8 | 16 | 0.38 | 67 | 3.55 | 57 | |
| 58 | 1600 | 20 | 7.2 | 1.0 | 7.5 | 15.8 | 6.8 | 16 | 0.4 | 67 | 3.6 | 58 | |
| 59 | 1600 | 20 | 7.1 | 1 | 7.6 | 15.7 | 6.8 | 16 | 0.39 | 66 | 3.5 | 59 | |
| 60 | 1600 | 20 | 6.9 | 0.8 | 7.2 | 15.7 | 6.3 | 11 | 0.23 | 66 | 3.3 | 60 | |
| 62 | 1600 | 20 | 6.5 | 0.8 | 6.9 | 15.5 | 6.1 | 11 | 0.25 | 65 | 3.3 | 62 | |
| 63 | 1600 | 20 | 6.5 | 0.8 | 6.9 | 15.7 | 6.1 | 11 | 0.26 | 65 | 3.3 | 63 | |
| 64 | 1550 | 18 | 6.5 | 0.8 | 7.2 | 14.7 | 6.4 | 10 | 0.21 | 65 | 3.1 | 64 | Silica addition started |
| 65 | 1550 | 21 | 7.5 | 0.8 | 7.4 | 15.1 | 6.5 | 11 | 0.26 | 68 | 3 | 65 | |
| 66 | 1600 | 20 | 7.1 | 0.8 | 7.2 | 15.3 | 6.4 | 11 | 0.27 | 68 | 3.1 | 66 | |
| 67 | 1800 | 10 | 6.7 | 0.8 | 7 | 12.5 | 6.5 | 11 | 0.28 | 70 | 3.23 | 67 | |
| 68 | 1900 | 30 | 6.8 | 0.8 | 7 | 11.95 | 6.4 | 11 | 0.27 | 68 | 2.5 | 68 | |
| 70 | 1900 | 22 | 7 | 0.8 | 7.1 | 12.65 | 6.5 | 11 | 0.27 | 72 | 2.9 | 70 | |
| 71 | 1900 | 21 | 7 | 0.8 | 7.4 | 12.45 | 6.5 | 11 | 0.27 | 63 | 2.2 | 71 | |
| 72 | 1900 | 20 | 6.9 | 0.8 | 7.3 | 12.55 | 6.5 | 11 | 0.27 | 53 | 1.65 | 72 | |
| 73 | 1900 | 20 | 6.8 | 0.8 | 7.2 | 13 | 6.5 | 11 | 0.24 | 70 | 2.45 | 73 | |
| 74 | 2000 | 21 | 6.2 | 0.5 | 7.2 | 12.5 | 7 | 10 | 0.21 | 72 | 2.05 | 74 | |
| 75 | 2100 | 21 | 6.2 | 0.8 | 7.2 | 12.9 | 7 | 10 | 0.24 | 71 | 2 | 75 | |
| 76 | 2100 | 21.3 | 6.13 | 0.8 | 7.21 | 12.8 | 6.8 | 10 | 0.25 | 70 | 2 | 76 | |
| 77 | 2100 | 20 | 6.1 | 0.8 | 7 | 13.5 | 6.4 | 10 | 0.24 | 50 | 0.99 | 77 | |
| 78 | 2100 | 19.7 | 6.1 | 0.8 | 6.9 | 13.5 | 6.5 | 10 | 0.24 | 51 | 1.08 | 78 | |
| 80 | 2100 | 20 | 6.3 | 0.8 | 7.6 | 13.2 | 6.4 | 10 | 0.3 | 50 | 1.54 | 80 | |
| 81 | 2100 | 19.5 | 6.5 | 0.8 | 7.3 | 13.8 | 6.5 | 10 | 0.23 | 33 | 0.57 | 81 | |
| 82 | 2100 | 22 | 6.5 | 0.9 | 7.2 | 13.95 | 6.5 | 10 | 0.24 | 33 | 0.55 | 82 | |
| 83 | 2100 | 22 | 6.5 | 1.3 | 7.6 | 13.95 | 6.5 | 10 | 0.23 | 33 | 0.5 | 83 | |
| 84 | 2000 | 20 | 6.5 | 1.8 | 8.1 | 13.1 | 6.3 | 10 | 0.19 | 32 | 0.33 | 84 | |
| 86 | 2000 | 20 | 6.4 | 2.1 | 8.15 | 13.5 | 6.2 | 11 | 0.21 | 33 | 0.46 | 86 | |
| 87 | 2000 | 20 | 6.5 | 2.3 | 8.1 | 13.7 | 6.3 | 10 | 0.2 | 32 | 0.47 | 87 | |
| 88 | 2000 | 20 | 6.5 | 1.4 | 7.9 | 13.75 | 6.3 | 10 | 0.26 | 32 | 0.78 | 88 | |
| 89 | 2000 | 20 | 6.5 | 1.6 | 8 | 13.75 | 6.5 | 10 | 0.26 | 33 | 0.75 | 89 | |
| 90 | 2000 | 26 | 6.5 | 1.9 | 8.2 | 13.75 | 6.7 | 10 | 0.27 | 33 | 0.75 | 90 | |
| 91 | 2000 | 24 | 6.5 | 2.1 | 8.2 | 13.7 | 6.7 | 10 | 0.28 | 33 | 0.75 | 91 | |
| 92 | 2000 | 26 | 6.6 | 3 | 8.3 | 13.6 | 6.8 | 10 | 0.22 | 70 | 1.95 | 92 | |
| 93 | 2000 | 23 | 6.5 | 2.3 | 8.0 | 13.6 | 6.7 | 10 | 0.21 | 70 | 1.78 | 93 | |
| 94 | 1950 | 15 | 6.5 | 1.2 | 8.4 | 12.2 | 6.4 | 14 | 0.24 | 71 | 1.28 | 94 | |
| 95 | 2000 | 20 | 6.7 | 2.2 | 8.3 | 12.15 | 6.3 | 12 | 0.21 | 72 | 1.35 | 95 | |
| 96 | 2000 | 19 | 6.6 | 2.2 | 8.1 | 12.4 | 6.2 | 12 | 0.22 | 70 | 1.3 | 96 | |
| 97 | 2000 | 20 | 6.5 | 2 | 8.0 | 12.6 | 6.3 | 12 | 0.22 | 72 | 1.32 | 97 | |
| 98 | 2000 | 20 | 6.5 | 2 | 7.8 | 13.3 | 6.5 | 14 | 0.27 | 73 | 1.38 | 98 | |
| 99 | 2000 | 18 | 6.3 | 1.6 | 8.0 | 13.6 | 6.5 | 13 | 0.24 | 70 | 1.26 | 99 | |
| 100 | 2000 | 23 | 6.3 | 2 | 8.0 | 14 | 6.3 | 12 | 0.24 | 70 | 1.25 | 100 | |
| 101 | 2000 | 21 | 6.2 | 2.1 | 8.0 | 14 | 6.2 | 12 | 0.24 | 70 | 1.3 | 101 | |
| 102 | 2000 | 20 | 6.3 | 2.5 | 8.1 | 14.1 | 6.3 | 13 | 0.24 | 70 | 1.25 | 102 | |
| 103 | 2000 | 20 | 6.3 | 2.4 | 8.0 | 14.15 | 6.3 | 12 | 0.23 | 70 | 1.3 | 103 | |
| 104 | 2000 | 20 | 6.5 | 1.7 | 8 | 14.7 | 6.6 | 12 | 0.28 | 70 | 1.3 | 104 | |
| 105 | 2000 | 20 | 6.5 | 2 | 8.1 | 15.2 | 6.5 | 12 | 0.3 | 71 | 1.38 | 105 | |
| 106 | 2000 | 20 | 6.5 | 1.7 | 7.9 | 14.4 | 6.5 | 12 | 0.32 | 71 | 1.7 | 106 | |
| 107 | 2000 | 20 | 6.5 | 2 | 8 | 13.8 | 6.7 | 10 | 0.27 | 72 | 1.7 | 107 | |
| 109 | 2000 | 20 | 6.5 | 2.1 | 7.9 | 13.7 | 6.8 | 11 | 0.31 | 73 | 1.8 | 109 | |
| 110 | 2000 | 21 | 6.5 | 2 | 8 | 13.8 | 6.8 | 11 | 0.3 | 73 | 1.8 | 110 | |
| 111 | 2000 | 20 | 6.5 | 2 | 7.8 | 12.9 | 6.6 | 11 | 0.3 | 72 | 1.95 | 111 | |

TABLE 7-continued

| Stack | Feed | | pro-1 | | pro-2 | | Volts | Amps | Volts | Amps | |
|---|---|---|---|---|---|---|---|---|---|---|---|
| Running hrs. | Flow cc/min | cond us/cm | pH | cond us/cm | PH | Resistivity Mohms | pH | V-1 vdc | A-1 adc | V-2 vdc | A-2 adc | Hrs |
| 112 | 2000 | 20 | 6.5 | 2.2 | 7.8 | 12.6 | 6.6 | 11 | 0.33 | 71 | 2.2 | 112 |
| 113 | 2000 | 21 | 6.4 | 2.1 | 8 | 13.4 | 6.5 | 12 | 0.33 | 70 | 2.15 | 113 |
| 114 | 2000 | 22 | 6.6 | 1.8 | 7.9 | 13.8 | 6 | 10 | 0.2 | 72 | 1.3 | 114 |
| 116 | 2000 | 23 | 6.7 | 1.9 | 8 | 14.2 | 6.7 | 9 | 0.2 | 70 | 1.42 | 116 |
| 117 | 2000 | 20 | 6.5 | 2 | 7.9 | 14.6 | 6.5 | 11 | 0.27 | 70 | 1.48 | 117 |
| 119 | 2000 | 26 | 6.6 | 2.7 | 8.3 | 14.2 | 6.7 | 11 | 0.33 | 68 | 1.68 | 119 |
| 120 | 2000 | 20 | 6.3 | 1.5 | 7.6 | 13.8 | 6.5 | 12 | 0.32 | 71 | 1.89 | 120 |
| 121 | 2000 | 20 | 6.4 | 1.8 | 7.9 | 13.9 | 6.5 | 12 | 0.33 | 70 | 1.94 | 121 |
| 122 | 2000 | 20 | 6.5 | 1.9 | 8 | 13.9 | 6.5 | 12 | 0.33 | 71 | 1.96 | 122 |
| 123 | 2000 | 19 | 6.1 | 1 | 7.4 | 14.3 | 6.7 | 12 | 0.26 | 72 | 1.4 | 123 |
| 125 | 2000 | 20 | 6.4 | 1.4 | 7.6 | 13.5 | 6.8 | 12 | 0.32 | 72 | 1.48 | 125 |
| 126 | 2000 | 23 | 6.4 | 1.9 | 7.5 | 13.3 | 6.7 | 12 | 0.29 | 70 | 1.4 | 126 |
| 128 | 2000 | 21 | 6.5 | 1.4 | 7.6 | 14.1 | 6.5 | 12 | 0.27 | 70 | 1.5 | 128 |
| 129 | 2000 | 20 | 6.5 | 1.3 | 7.5 | 14.1 | 6.5 | 10 | 0.28 | 70 | 1.63 | 129 |
| 130 | 2000 | 25 | 6.3 | 1.8 | 8.1 | 14.5 | 6.7 | 10 | 0.29 | 70 | 1.6 | 130 |
| 131 | 2000 | 23 | 6.1 | 1.3 | 8.1 | 14.6 | 6.3 | 10 | 0.27 | 69 | 1.4 | 131 |
| 132 | 2000 | 23 | 6.3 | 1.2 | 8.1 | 14 | 6.4 | 10 | 0.26 | 71 | 1.5 | 132 |
| 133 | 2000 | 19 | 5.8 | 1 | 7.3 | 14.4 | 6.4 | 11 | 0.24 | 74 | 1.12 | 17 |
| 135 | 2000 | 21 | 6.5 | 2 | 7.8 | 14.7 | 5.9 | 11 | 0.28 | 72 | 1.5 | 135 |
| 137 | 2000 | 20 | 6.3 | 2 | 7.6 | 14.2 | 5.8 | 11 | 0.28 | 72 | 1.65 | 137 |
| 138 | 2000 | 20 | 6.2 | 2.1 | 7.5 | 14 | 6.1 | 11 | 0.28 | 71 | 1.55 | 138 |
| 139 | 2000 | 20 | 6 | 2 | 7.6 | 14 | 6.4 | 11 | 0.22 | 73 | 1.32 | 139 |
| 140 | 1900 | 26 | 6.5 | 2.3 | 8.1 | 14.1 | 6.8 | 11 | 0.22 | 72 | 1.35 | 140 |
| 141 | 1900 | 15 | 6.3 | 2 | 7.9 | 14.4 | 6.5 | 11 | 0.23 | 73 | 1.5 | 141 |
| 142 | 2000 | 20 | 6 | 1.4 | 7.5 | 14.35 | 6.3 | 11 | 0.24 | 71 | 1.5 | 142 |
| 143 | 2000 | 23 | 5.8 | 1.3 | 7.5 | 14.4 | 6.4 | 11 | 0.25 | 69 | 1.5 | 143 |
| 145 | 2000 | 20 | 5.8 | 1.2 | 7.4 | 14.5 | 6.4 | 11 | 0.27 | 69 | 1.65 | 145 |
| 146 | 2000 | 19 | 5.7 | 1 | 7.2 | 14.3 | 6.5 | 11 | 0.26 | 73 | 1.87 | 146 |
| 147 | 2000 | 19 | 5.6 | 1.1 | 7.3 | 14.3 | 6.5 | 11 | 0.26 | 73 | 2.6 | 147 |
| 149 | 2000 | 19 | 5.6 | 1 | 7.3 | 14 | 6.3 | 11 | 0.16 | 72 | 2.65 | 149 |
| 150 | 1900 | 21 | 6 | 1.8 | 7.5 | 14.2 | 6 | 13 | 0.18 | 70 | 1.8 | 150 |
| 151 | 2000 | 19.5 | 5.9 | 1.2 | 7.3 | 14.15 | 6.2 | 13 | 0.19 | 70 | 1.85 | 151 |
| 152 | 2000 | 20 | 5.8 | 1.6 | 7.35 | 14.5 | 6.2 | 12 | 0.21 | 70 | 2.15 | 152 |
| 153 | 2000 | 20 | 5.7 | 1.4 | 7.35 | 14.2 | 6.1 | 12 | 0.21 | 70 | 2.3 | 153 |
| 154 | 2000 | 20 | 5.8 | 1.5 | 7.45 | 13.9 | 6 | 12 | 0.22 | 70 | 2.23 | 154 |
| 155 | 2000 | 20 | 5.9 | 1.5 | 7.45 | 13.8 | 6.1 | 12 | 0.22 | 70 | 2.2 | 155 |
| 156 | 2000 | 20 | 5.9 | 2 | 7.5 | 14.1 | 6.1 | 12 | 0.21 | 70 | 2.28 | 156 |
| 158 | 2000 | 19.5 | 5.9 | 2.1 | 7.4 | 13.9 | 6.2 | 12 | 0.21 | 70 | 2.7 | 158 |
| 159 | 2000 | 19.5 | 5.9 | 2 | 7.6 | 14.1 | 6.2 | 12 | 0.21 | 70 | 2.75 | 159 |
| 160 | 1900 | 20 | 5.8 | 1.5 | 7.6 | 12.5 | 6.1 | 12 | 0.18 | 71 | 2.2 | 160 |
| 161 | 2000 | 20 | 5.8 | 1.7 | 7.5 | 12.7 | 6.2 | 11 | 0.18 | 72 | 2.35 | 161 |
| 162 | 1950 | 2 | 5.9 | 0.5 | 6.1 | 6.5 | 6.2 | 12 | 0.19 | 70 | 3.0 | 162 |
| 163 | 2100 | 2 | 6 | 0.5 | 7.1 | 15.2 | 6.1 | 9.8 | 0.17 | 73 | 1.5 | 163 |
| 164 | 1600 | 15 | 6 | 0.7 | 7 | 15.6 | 6.2 | 23 | 0.26 | 73 | 1.9 | 164 |
| 166 | 1600 | 23 | 6.1 | 1 | 6.9 | 16.2 | 6.1 | 13 | 0.15 | 70 | 2.1 | 166 |
| 167 | 2200 | 20 | 6.2 | 1.2 | 6.8 | 16.3 | 6.2 | 13 | 0.13 | 70 | 2.1 | 167 |
| 168 | 2200 | 21 | 5.9 | 1.8 | 7.6 | 16.6 | 6.3 | 18 | 0.23 | 74 | 2.1 | 168 |
| 170 | 2200 | 20 | 5.8 | 2.1 | 7.7 | 16.6 | 6.2 | 18 | 0.22 | 70 | 2.1 | 170 |
| 171 | 2200 | 20 | 5.8 | 2.5 | 7.8 | 16.7 | 6.3 | 18 | 0.21 | 70 | 2.1 | 171 |
| 172 | 2200 | 20 | 5.8 | 2.8 | 7.6 | 16.9 | 6 | 18 | 0.21 | 72 | 2.1 | 172 |
| 173 | 2200 | 21 | 5.9 | 3 | 7.3 | 17 | 6 | 18 | 0.23 | 72 | 1.9 | 173 |
| 174 | 2200 | 24 | 6 | 4 | 7.4 | 16.6 | 6.1 | 18 | 0.17 | 70 | 2.0 | 174 |
| 176 | 2200 | 21 | 5.8 | 3.8 | 6.9 | 17 | 6 | 18 | 0.2 | 72 | 2.0 | 176 |
| 177 | 2200 | 20 | 5.8 | 4.3 | 6.6 | 17.1 | 6 | 18 | 0.21 | 72 | 2.0 | 177 |
| 178 | 2200 | 23 | 5.7 | 4.8 | 6.1 | 17.4 | 6.5 | 18 | 0.2 | 70 | 1.9 | 178 |
| 179 | 1900 | 23 | 5.8 | 5 | 6.5 | 17.2 | 6 | 17 | 0.24 | 72 | 2.0 | 179 |
| 180 | 1900 | 22 | 5.7 | 4.6 | 6.5 | 17.25 | 6.1 | 17 | 0.25 | 70 | 2.0 | 180 |
| 181 | 1900 | 22 | 5.7 | 4.2 | 6.3 | 17.4 | 6.1 | 17 | 0.25 | 70 | 2.0 | 181 |
| 182 | 2000 | 22 | 5.9 | 4 | 6.4 | 17.4 | 6.1 | 18 | 0.19 | 72 | 2.4 | 182 |
| 183 | 2000 | 22 | 5.8 | 4.2 | 6.3 | 17.6 | 6.1 | 18 | 0.22 | 72 | 2.3 | 183 |
| 184 | 2000 | 21 | 5.7 | 4.7 | 6.1 | 17.7 | 6.2 | 18 | 0.23 | 72 | 2.2 | 184 |
| 185 | 2000 | 19 | 5.7 | 4.6 | 6 | 17.8 | 6.2 | 18 | 0.23 | 74 | 2.3 | 185 |
| 187 | 2000 | 20 | 5.7 | 4 | 6 | 17.9 | 6.2 | 18 | 0.23 | 74 | 2.3 | 187 |
| 188 | 2000 | 20 | 5.7 | 4.3 | 6.1 | 18.0 | 6.2 | 13 | 0.13 | 70 | 2.1 | 188 |
| 189 | 2000 | 20 | 5.7 | 5 | 6.2 | 18.00 | 6.1 | 12 | 0.13 | 70 | 2.1 | 189 |
| 190 | 2000 | 21 | 5.7 | 5 | 6.3 | 17.95 | 6.1 | 12 | 0.12 | 70 | 2.1 | 190 |
| 191 | 2000 | 11 | 5.9 | 3.5 | 6 | 17.95 | 6 | 12 | 0.09 | 73 | 2.2 | 191 |
| 193 | 2000 | 20 | 5.9 | 3.7 | 6.9 | 18.10 | 6.1 | 13 | 0.13 | 71 | 2.2 | 193 |
| 195 | 2000 | 23 | 5.9 | 5.8 | 5.8 | 18.00 | 6.2 | 12 | 0.14 | 70 | 2.1 | 195 |
| 196 | 2000 | 20 | 6 | 5.7 | 5.9 | 17.80 | 6.3 | 12 | 0.13 | 70 | 2.3 | 196 |
| 197 | 2000 | 22 | 6 | 6.2 | 6 | 17.75 | 6.3 | 12 | 0.13 | 70 | 2.13 | 197 |
| 199 | 2000 | 21 | 6 | 7 | 5.3 | 17.75 | 6.3 | 12 | 0.13 | 72 | 2.1 | 199 |
| 200 | 2000 | 20 | 6 | 6.8 | 5.5 | 17.75 | 6.3 | 12 | 0.13 | 72 | 2.0 | 200 |
| 201 | 2000 | 19 | 5.8 | 7 | 5.4 | 17.75 | 6.1 | 12 | 0.09 | 70 | 2.1 | 201 |

TABLE 7-continued

| Stack Running hrs. | Feed Flow cc/min | Feed cond us/cm | Feed pH | pro-1 cond us/cm | pro-1 PH | pro-2 Resistivity Mohms | pro-2 pH | Volts V-1 vdc | Amps A-1 adc | Volts V-2 vdc | Amps A-2 adc | Hrs | |
|---|---|---|---|---|---|---|---|---|---|---|---|---|---|
| 202 | 2000 | 22 | 5.9 | 7.3 | 5.7 | 17.7 | 6.1 | 17 | 0.21 | 72 | 2.2 | 202 | |
| 203 | 2000 | 22 | 6 | 8 | 5.7 | 17.7 | 6.3 | 18 | 0.22 | 70 | 2.3 | 203 | |
| 204 | 2000 | 22 | 6 | 7.7 | 5.5 | 17.5 | 6.2 | 18 | 0.23 | 71 | 2.1 | 204 | |
| 205 | 2000 | 20 | 6 | 6.9 | 5.8 | 17.3 | 6.3 | 18 | 0.23 | 70 | 2.1 | 205 | |
| 207 | 2000 | 20 | 6.1 | 7.3 | 5.9 | 17.25 | 6.2 | 12 | 0.12 | 70 | 2.25 | 207 | |
| 208 | 2000 | 23 | 6.2 | 7.2 | 5.8 | 17.2 | 6.1 | 12 | 0.14 | 70 | 2.1 | 208 | |
| 209 | 1300 | 22 | 6 | 5 | 6 | 17.1 | 6 | 12 | 0.15 | 71 | 1.9 | 209 | |
| 210 | 2050 | 23 | 5.9 | 8 | 5.6 | 17.6 | 6.2 | 13 | 0.13 | 70 | 2.15 | 210 | |
| 211 | 2100 | 22 | 5.9 | 7.6 | 5.6 | 17.55 | 6.2 | 13 | 0.13 | 70 | 2.1 | 211 | |
| 212 | 2100 | 22 | 5.9 | 7.8 | 5.7 | 17.6 | 6.3 | 13 | 0.14 | 70 | 2.16 | 212 | |
| 213 | 2100 | 21 | 5.9 | 8.5 | 5.7 | 17.55 | 6.3 | 13 | 0.14 | 70 | 2.08 | 213 | |
| 214 | 2000 | 18 | 5.75 | 7 | 5.6 | 17.5 | 6.2 | 12 | 0.1 | 70 | 2.2 | 214 | |
| 215 | 2000 | 22 | 5.8 | 8.5 | 5.5 | 17.6 | 6.1 | 12 | 0.12 | 70 | 2.25 | 215 | |
| 216 | 2000 | 22 | 5.8 | 9 | 5.45 | 17.7 | 6.1 | 12 | 0.12 | 70 | 2.15 | 216 | |
| 217 | 2000 | 22 | 5.8 | 9 | 5.5 | 17.6 | 6.1 | 12 | 0.12 | 70 | 2.11 | 217 | |
| 218 | 2000 | 21 | 5.8 | 9 | 5.5 | 17.6 | 6.1 | 12 | 0.13 | 70 | 2.08 | 218 | |
| 219 | 2000 | 20 | 5.7 | 9 | 5.5 | 17.4 | 6.1 | 12 | 0.12 | 70 | 2.28 | 219 | |
| 222 | 2000 | 20 | 5.8 | 9 | 5.5 | 17.3 | 6.1 | 12 | 0.13 | 70 | 2.3 | 222 | |
| 223 | 1400 | 20 | 5.8 | 5.5 | 6 | 8.2 | 6 | 12 | 0.17 | 71 | 2.7 | 223 | |
| 224 | 1650 | 22 | 5.7 | 7.3 | 6 | 10.2 | 6.1 | 12 | 0.16 | 70 | 2.8 | 224 | |
| 225 | 1700 | 21 | 5.8 | 7.2 | 6.1 | 12.8 | 6.1 | 12 | 0.17 | 70 | 2.9 | 225 | |
| 226 | 1700 | 21 | 5.8 | 6.8 | 6.1 | 14.3 | 6 | 12 | 0.17 | 70 | 2.95 | 226 | |
| 227 | 1600 | 20 | 5.9 | 6.5 | 6.1 | 12.5 | 6 | 12 | 0.16 | 40 | 2.5 | 227 | |
| 228 | 1800 | 21 | 6.3 | 6.2 | 6.2 | 8.5 | 6.4 | 12 | 0.18 | 42 | 3.0 | 228 | |
| 229 | 1800 | 20 | 6.1 | 6.7 | 6 | 5.1 | 6.2 | 12 | 0.18 | 41 | 3.0 | 229 | |
| 230 | 1800 | 19 | 6.2 | 4.2 | 6.5 | 17.5 | 6.5 | 23 | 0.23 | 72 | 2.2 | 230 | |
| 232 | 1500 | 21 | 6.3 | 2.5 | 6.9 | 18.0 | 6.5 | 21 | 0.19 | 72 | 2.12 | 232 | |
| 234 | 1500 | 22 | 6.4 | 2.2 | 6.8 | 18.0 | 6.5 | 19 | 0.21 | 72 | 2.2 | 234 | |
| 236 | 2000 | 18 | 5.9 | 2.5 | 6.8 | 18.0 | 6.1 | 16 | 0.16 | 70 | 2.27 | 236 | |
| 238 | 2000 | 10 | 5.8 | 2 | 6 | 18.2 | 6.1 | 20 | 0.17 | 72 | 2.3 | 238 | |
| 239 | 2000 | 23 | 6.1 | 4 | 6.8 | 17.9 | 6.2 | 18 | 0.23 | 70 | 2.2 | 239 | |
| 242 | 2000 | 22 | 6.1 | 5 | 6.5 | 17.5 | 6.3 | 18 | 0.2 | 70 | 2.1 | 242 | |
| 243 | 2000 | 23 | 6.2 | 5.3 | 6.6 | 17.4 | 6.5 | 20 | 0.23 | 70 | 1.99 | 243 | |
| 244 | 2000 | 22 | 6.3 | 5.1 | 6.7 | 17.5 | 6.7 | 20 | 0.23 | 70 | 2 | 244 | |
| 246 | 2000 | 23 | 6.4 | 5 | 6.8 | 17.5 | 6.5 | 22 | 0.26 | 70 | 2.15 | 246 | |
| 247 | 2000 | 23 | 6.4 | 5 | 6.3 | 17.45 | 6.1 | 23 | 0.28 | 70 | 2.2 | 247 | |
| 248 | 2000 | 23 | 5.95 | 6 | 6.1 | 17.15 | 6.3 | 16 | 0.16 | 72 | 2.08 | 248 | |
| 250 | 2000 | 24 | 5.8 | 7.8 | 5.3 | 17.3 | 6.1 | 15 | 0.16 | 72 | 2.18 | 250 | |
| 251 | 2000 | 23 | 5.8 | 7.3 | 5 | 17.35 | 6 | 21 | 0.24 | 71 | 2.05 | 251 | |
| 252 | 2000 | 23 | 5.8 | 6.3 | 5.1 | 17.4 | 6.1 | 21 | 0.23 | 70 | 2 | 252 | |
| 253 | 2000 | 22 | 5.9 | 5.3 | 5.3 | 17.1 | 6.4 | 21 | 0.25 | 70 | 2.1 | 253 | |
| 254 | 2000 | 21 | 6 | 4.9 | 5.3 | 17.25 | 6.5 | 22 | 0.26 | 72 | 2.1 | 254 | |
| 256 | 2000 | 24 | 6.3 | 3.9 | 5.6 | 17.25 | 6.8 | 23 | 0.26 | 70 | 2 | 256 | |
| 258 | 2000 | 21 | 6.3 | 3.3 | 6.1 | 17.3 | 6.5 | 22 | 0.21 | 71 | 1.98 | 258 | Na$_2$SO$_4$ addition started |
| 259 | 2000 | 21 | 6.1 | 3.5 | 6 | 17.35 | 6.3 | 22 | 0.23 | 71 | 2.08 | 259 | |
| 260 | 2000 | 21 | 6.1 | 3.5 | 5.9 | 17.4 | 6.3 | 23 | 0.24 | 71 | 2.18 | 260 | |
| 262 | 2000 | 21 | 6.3 | 2.8 | 6.1 | 17.35 | 6.6 | 22 | 0.26 | 71 | 2.1 | 262 | |
| 264 | 2000 | 21 | 6.1 | 3 | 6.6 | 17.3 | 6.5 | 22 | 0.26 | 70 | 2 | 264 | |
| 265 | 2000 | 22 | 6 | 2.9 | 6.2 | 17.2 | 6.5 | 22 | 0.25 | 70 | 2.04 | 265 | |
| 267 | 1900 | 22 | 5.85 | 2 | 7.2 | 14.1 | 6.05 | 18 | 0.18 | 70 | 1.95 | 267 | |
| 268 | 1900 | 22 | 6.2 | 3.3 | 7.8 | 14.8 | 6.5 | 19 | 0.18 | 72 | 2.1 | 268 | |
| 269 | 1900 | 22 | 6.1 | 3.6 | 7.3 | 15 | 6.5 | 19 | 0.18 | 72 | 2.1 | 269 | |
| 270 | 2000 | 22 | 6.2 | 4.2 | 6.7 | 15.3 | 6.5 | 19 | 0.18 | 72 | 2.1 | 270 | |
| 271 | 2000 | 21 | 6.4 | 4.1 | 6.6 | 15.45 | 6.7 | 19 | 0.19 | 71 | 2 | 271 | |
| 273 | 2000 | 21 | 6.2 | 4.5 | 6.3 | 15.5 | 6.5 | 19 | 0.18 | 71 | 2 | 273 | |
| 275 | 2000 | 20 | 6.1 | 4.1 | 6.2 | 15.45 | 6.2 | 18 | 0.18 | 71 | 2 | 275 | |
| 276 | 2000 | 16 | 7.8 | 3.3 | 6.5 | 14.3 | 6.2 | 27 | 0.27 | 70 | 2.1 | 276 | NaHCO$_3$ addition started |
| 277 | 2000 | 21 | 7.7 | 4.7 | 5.1 | 14.25 | 6.4 | 19 | 0.18 | 70 | 2.15 | 277 | |
| 278 | 2000 | 21 | 7.8 | 6.2 | 5.1 | 14.4 | 6.7 | 202 | 0.21 | 70 | 2.2 | 278 | |
| 279 | 2000 | 22 | 8 | 6.5 | 5.2 | 14.5 | 6.8 | 20 | 0.22 | 70 | 2.14 | 279 | |
| 281 | 2000 | 21 | 7.9 | 6 | 5.1 | 14.75 | 6.7 | 23 | 0.24 | 70 | 2.1 | 281 | |
| 282 | 2000 | 23 | 8 | 6.5 | 5.2 | 14.9 | 6.7 | 21 | 0.23 | 70 | 2.08 | 282 | |
| 283 | 2000 | 24 | 8 | 6.6 | 5.2 | 14.95 | 6.6 | 21 | 0.22 | 70 | 2 | 283 | |
| 284 | 2000 | 22 | 7.9 | 7 | 5.2 | 15 | 6.5 | 21 | 0.21 | 71 | 2.17 | 284 | |
| 285 | 2000 | 23 | 7.9 | 7.2 | 5.2 | 15.2 | 6.5 | 21 | 0.21 | 71 | 2.1 | 285 | |
| 286 | 2000 | 22 | 7.95 | 5.9 | 5.3 | 14.5 | 6.4 | 23 | 0.25 | 71 | 2 | 286 | |
| 287 | 2000 | 21 | 7.9 | 6 | 5.1 | 15 | 6.3 | 22 | 0.23 | 70 | 2.1 | 287 | |
| 288 | 2000 | 21 | 8 | 6 | 5 | 15.2 | 6.5 | 22 | 0.24 | 72 | 2.15 | 288 | |
| 290 | 2000 | 16 | 6 | 4 | 5.2 | 16 | 6 | 22 | 0.26 | 72 | 2.1 | 290 | MgCl$_2$6H$_2$O addition started |
| 292 | 2000 | 15 | 5.8 | 3.7 | 5.4 | 16.4 | 6.5 | 22 | 0.26 | 72 | 2 | 292 | |
| 293 | 2000 | 16 | 5.8 | 3.8 | 5.4 | 16.5 | 6.5 | 23 | 0.28 | 72 | 2.1 | 293 | |

TABLE 7-continued

| Stack Running hrs. | Feed Flow cc/min | Feed cond us/cm | Feed pH | pro-1 cond us/cm | pro-1 PH | pro-2 Resistivity Mohms | pro-2 pH | Volts V-1 vdc | Amps A-1 adc | Volts V-2 vdc | Amps A-2 adc | Hrs | |
|---|---|---|---|---|---|---|---|---|---|---|---|---|---|
| 294 | 2000 | 16 | 5.8 | 3.4 | 5.4 | 16.6 | 6.5 | 23 | 0.28 | 72 | 2.08 | 294 | |
| 296 | 2000 | 15 | 5.8 | 2.6 | 5.6 | 16.6 | 6 | 22 | 0.25 | 70 | 1.9 | 296 | |
| 297 | 2000 | 15.5 | 5.7 | 2.5 | 5.2 | 16.7 | 6 | 21 | 0.23 | 70 | 2 | 297 | |
| 298 | 2000 | 15.5 | 5.7 | 2.6 | 5.2 | 16.85 | 6 | 21 | 0.24 | 70 | 1.99 | 298 | |
| 299 | 2000 | 16 | 5.9 | 2.5 | 5.4 | 16.95 | 6.2 | 21 | 0.24 | 72 | 1.95 | 299 | |
| 301 | 2000 | 16 | 5.8 | 2.6 | 5.3 | 17.1 | 6.2 | 21 | 0.25 | 71 | 1.99 | 301 | |
| 303 | 2000 | 14 | 6 | 2 | 5.8 | 17.2 | 6.3 | 20 | 0.23 | 72 | 1.9 | 303 | CaCl$_2$ addition started |
| 304 | 2000 | 14 | 6.1 | 1.9 | 5.7 | 17.3 | 6.3 | 20 | 0.23 | 72 | 1.86 | 304 | |
| 305 | 2000 | 16 | 5.5 | 1.7 | 5.9 | 17.3 | 6 | 22 | 0.24 | 71 | 2.1 | 305 | |
| 306 | 2000 | 16.5 | 5.7 | 1.5 | 5.7 | 17.25 | 6.1 | 23 | 0.27 | 70 | 2.1 | 306 | |
| 307 | 2000 | 16 | 5.6 | 1.5 | 5.6 | 17.4 | 6.2 | 23 | 0.28 | 70 | 2 | 307 | |
| 309 | 2000 | 17 | 5.6 | 1.5 | 5.8 | 17.5 | 6 | 12 | 0.12 | 72 | 1.98 | 309 | |
| 310 | 2000 | 17 | 5.6 | 1.5 | 6.2 | 17.6 | 6 | 12 | 0.13 | 72 | 2 | 310 | |
| 312 | 2000 | 17 | 5.7 | 1.7 | 6 | 17.6 | 5.9 | 12 | 0.13 | 72 | 2 | 312 | |
| 313 | 2000 | 16 | 5.8 | 2 | 6.1 | 17.65 | 6 | 12 | 0.13 | 72 | 2.1 | 313 | |

Figure 7:
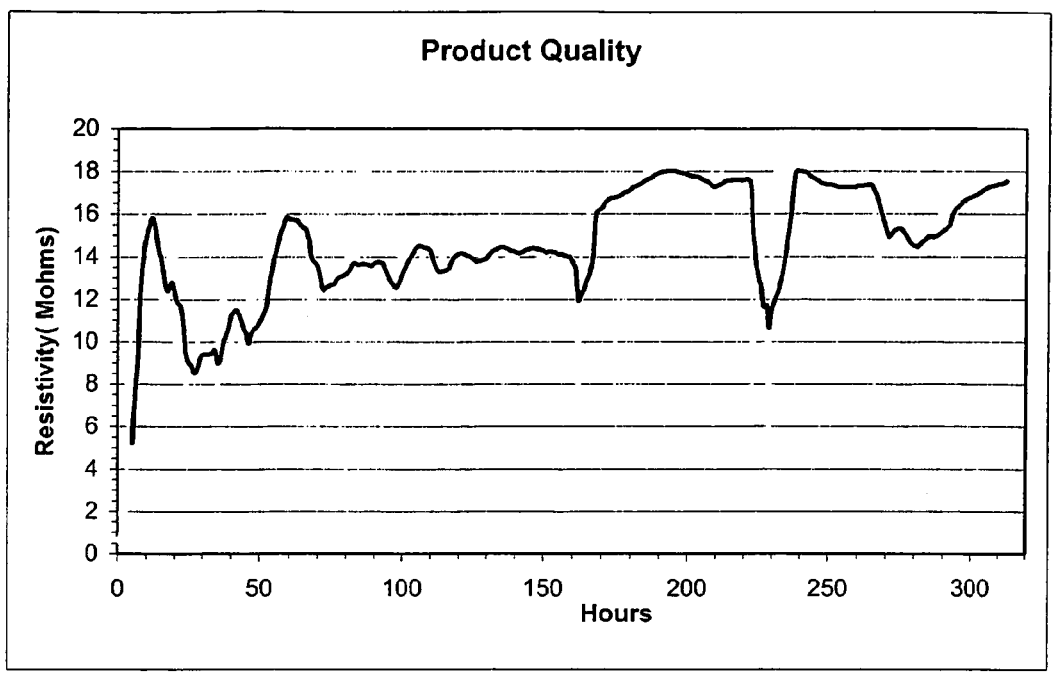
FIG. 7 is a graph of product quality expressed as a function of resistivity over time.

After the initial stabilizing period the product resistivity was found as set forth in the FIG. 7.

Ion Removal Efficiency in the First Stage a. Highly Ionic Species

| Component | Removal in percentage % min & max observed |
|---|---|
| Sodium (Na) | 80.4 and 94.1 |
| Chloride (Cl) | 83.5 and 85.8 |
| Sulphate (SO$_4$) | 90 and 91.7 |
| Magnesium (Mg) | 98.4 and 99.3 |
| Calcium Ca | 99.1 and 99.3 |
| Total CO$_2$ | 63 and 78 | b. Weakly Ionic Species

Silica, which was introduced in the feed to a limit of 200 ppb, remained equal to that amount following the first stage, confirming that there is little or no silica reduction in the first stage.

Total CO$_2$ measured by calculation was found to be decreased during the first stage, as shown below

| Component | Removal in percentage % min & max observed |
|---|---|
| Total CO$_2$ | 63 and 78 |

Ion Removal Efficiency in the Second Stage a. Highly Ionic Species

The above anion and cations were found to be absent in the second stage within the precision of instruments that were used. Minimum detectable limits of the analytical instruments used were as below:

| Component | Minimum detectable limit by the instrument used In ppm |
|---|---|
| Sodium (Na) | 0.1 |
| Chloride (Cl) | 1.0 |
| Sulphate (SO$_4$) | 1.0 |
| Magnesium (Mg) | 0.05 |
| Calcium (Ca) | 0.05 | b. Weakly Ionic Species

The elimination of silica was observed to be minimal in the first stage. The amount fed in the feed was going in the second stage where the reduction was observed as below:

| Component | Removal in percentage % min & max observed |
|---|---|
| Silica (Si) | More than 98% Instrument's minimum detectable limit is 0.001 ppm |

It is evident that significant removal of all divalent ions including monovalent sodium and chloride is happening in the first stage of FDI at minimum voltage above water splitting making the process energy efficient. High voltage is applied only when it is required for water splitting, which is energy intensive only for part of the process where ionic load is minimized to insignificant levels and overall hardness tolerance goes up.

Although we have described certain present preferred embodiments of our fractional deionization process, it should be distinctly understood that our invention is not limited thereto, but may include equivalent methods. It is further to be distinctly understood that the present invention is not limited to the deionization of water and applies to the evaluation of all liquids. Obviously, many modifications and variations of the present invention are possible in light of the above teachings. It is therefore to be understood that, within the scope of the appended claims, the invention may be practiced otherwise than as specifically described.

We claim:

1. An improved electrodeionization stack, wherein a flow path comprises a first stage and a second stage, wherein said first stage comprises a first set of electrodes and said second stage comprises a second set of electrodes, wherein said first set of electrodes has a first voltage and said second set of electrodes has a second voltage, and wherein said second voltage is greater than said first voltage, and wherein said first stage is mechanically and electrically separated from said second stage, said electrodeionization stack having a plurality of membranes in each of said first stage and said second stage, wherein at least one cationic membrane and at least one anionic membrane are used across said first stage and said second stage, and wherein said at least one anionic membrane and at least one cationic membrane are insulated between said first stage and said second stage.

2. A liquid purification process comprising the following steps:
   (a) providing a feed stream of the liquid to be purified;
   (b) treating the feed stream in a first module comprising at least one anode and at least one cathode wherein a first voltage is applied across said at least one anode and said at least one cathode to substantially remove at least a first ionic species that causes scaling from said feed stream to produce a first product stream;
   (c) treating the first product stream in a second module comprising at least one anode and at least one cathode, wherein a second voltage the same as said first voltage is applied across said at least one anode and said at least one cathode to substantially remove at least a second ionic species from said first product stream to produce a second product stream, wherein said second module is succeeded by at least one successive module, each said successive module having at least one anode and at least one cathode wherein a voltage different from the voltage of the preceding module is applied across said at least one anode and said at least one cathode, and each said successive module treating the product stream from the preceding module.

3. The process of claim 2, wherein each said successive module produces a successive reject stream.

* * * * *